G. A. PETERSON.
BRICK MOLDING AND PRESSING MACHINE.
APPLICATION FILED FEB. 13, 1915.

1,292,869.

Patented Jan. 28, 1919.
24 SHEETS—SHEET 1.

WITNESSES
Henry Salomonson
James Parker

INVENTOR
George A. Peterson
By Marcus S. Levé
His Attorney

G. A. PETERSON.
BRICK MOLDING AND PRESSING MACHINE.
APPLICATION FILED FEB. 13, 1915.

1,292,869.

Patented Jan. 28, 1919.
24 SHEETS—SHEET 3.

WITNESSES
Henry Salomonson
James Parker

INVENTOR
George A. Peterson
By Marcus S. Levi
His Attorney

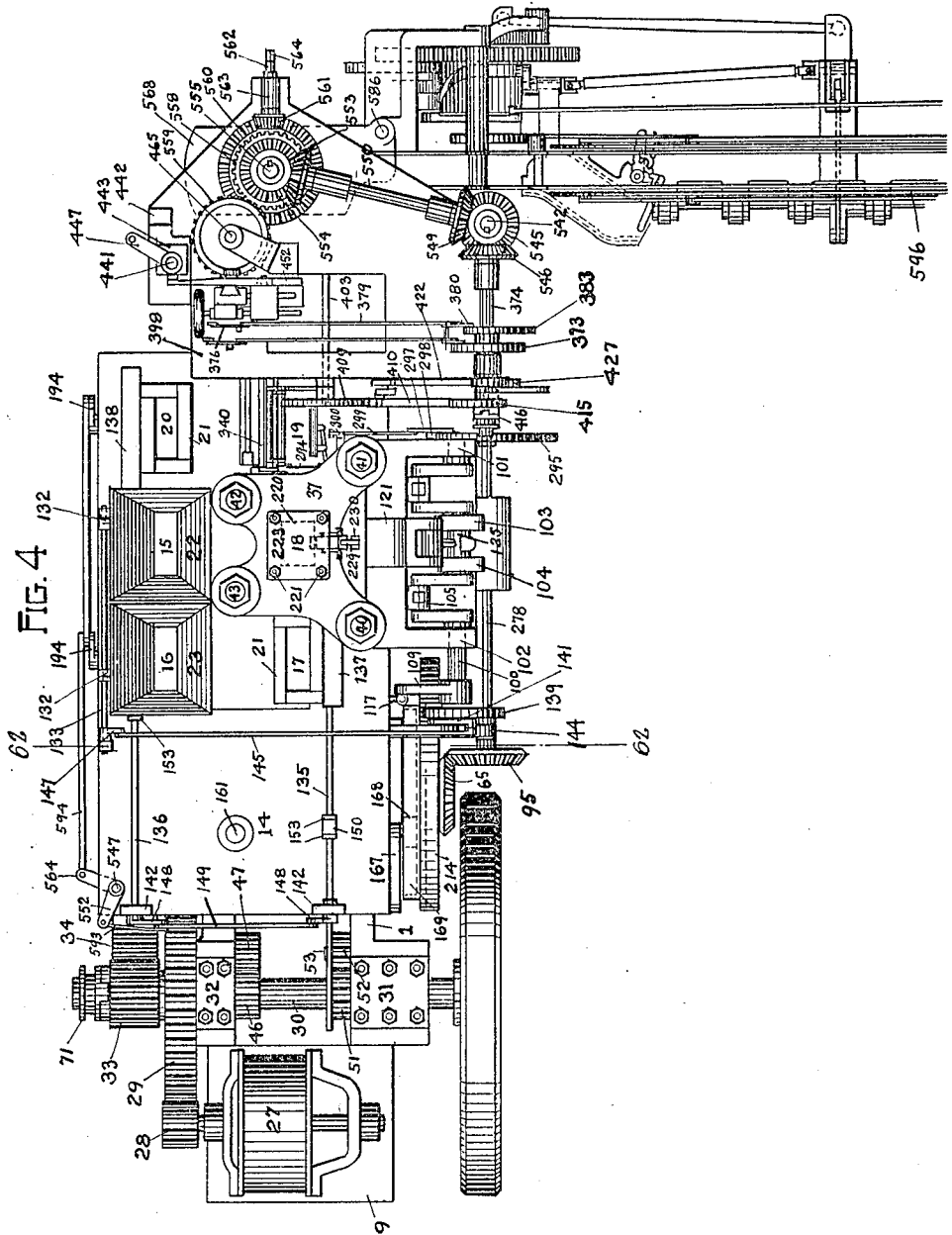

G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 5.
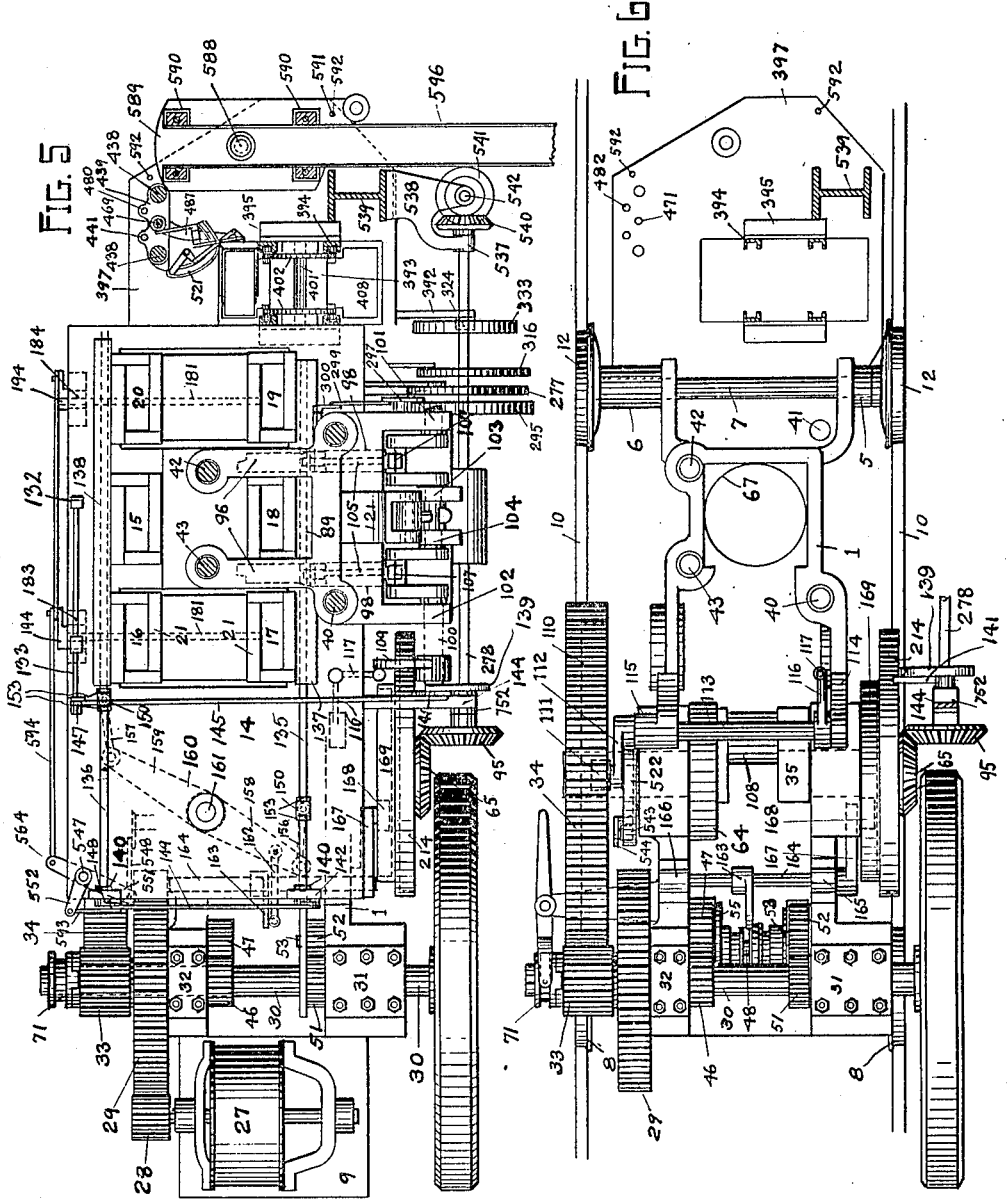
WITNESSES
Henry Salomonson
James Parker
INVENTOR
George A. Peterson
By Marcus S. Levé
His attorney G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 6.
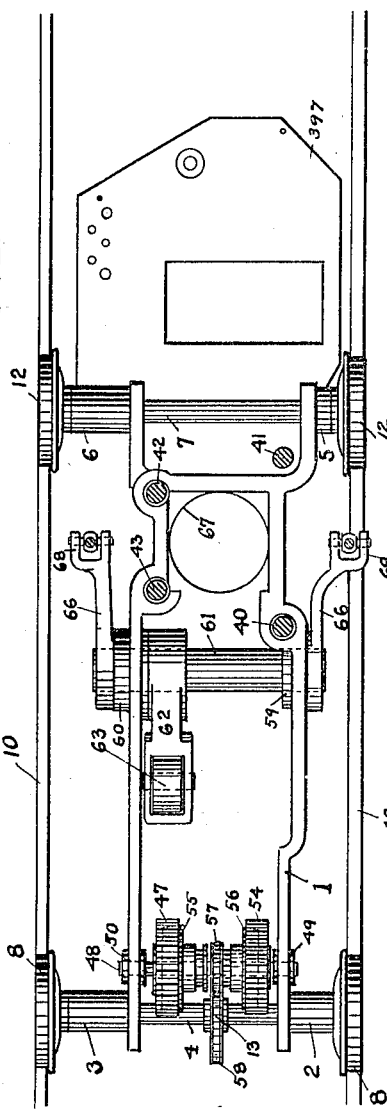
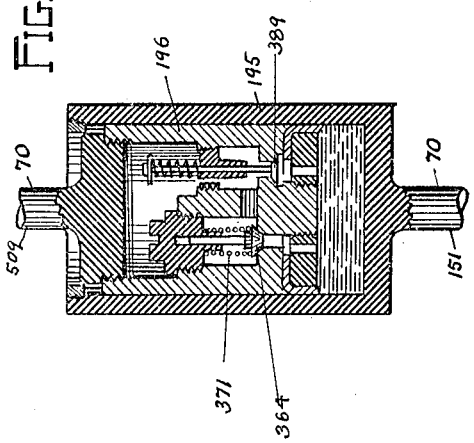
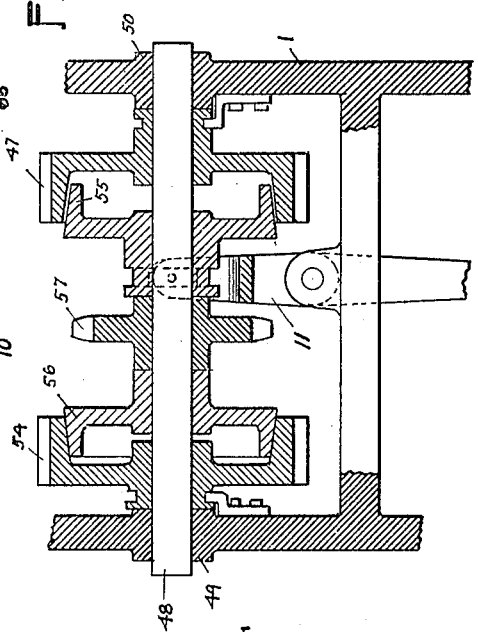
WITNESSES
Henry Salomonson
James Parker
INVENTOR
George A. Peterson
By Marcus S. Levi
His Attorney

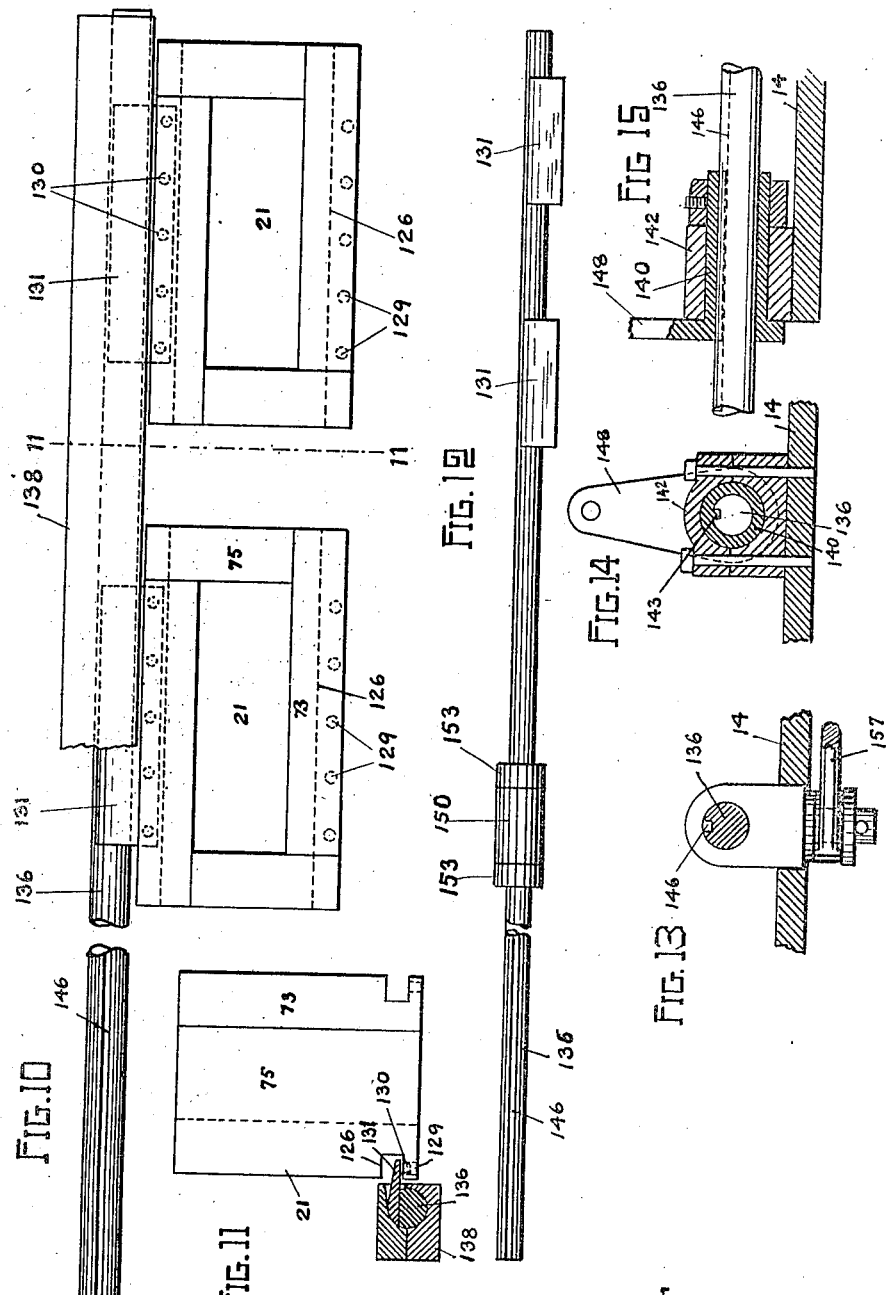

G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 8.
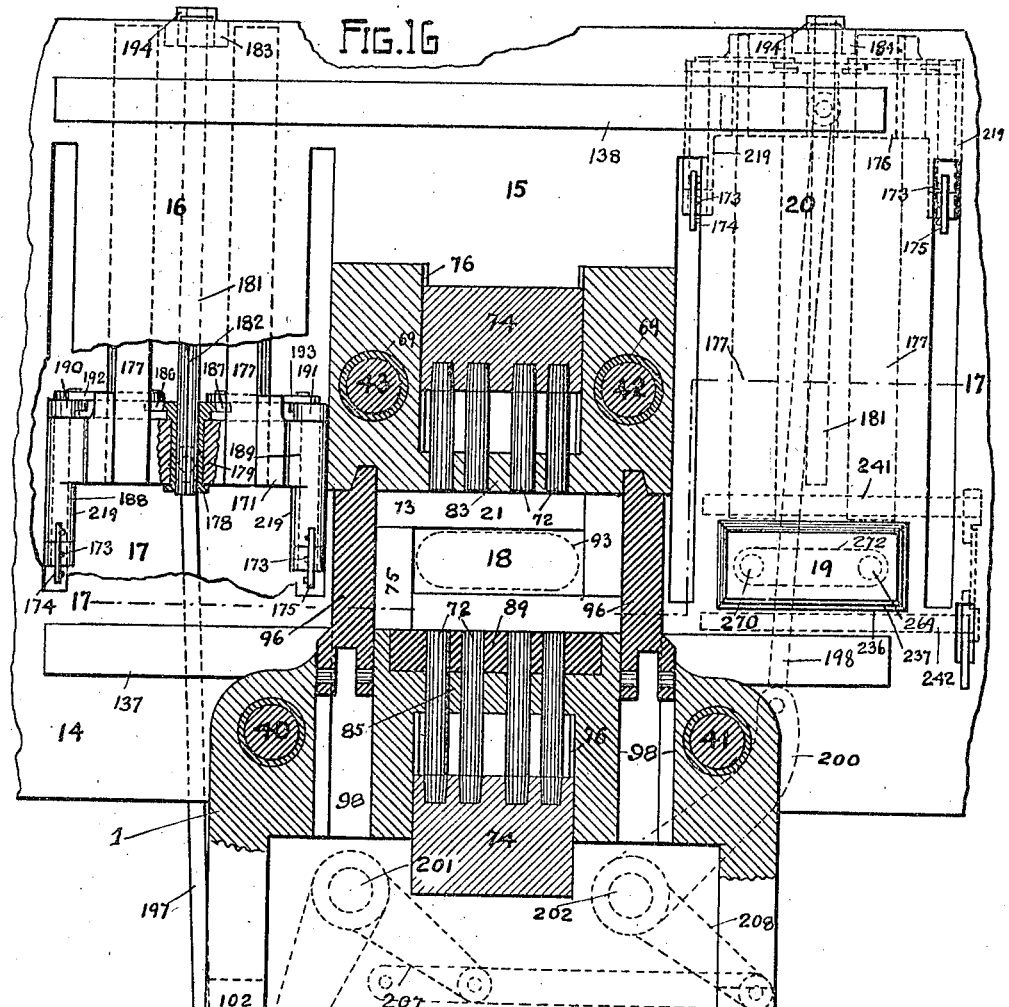
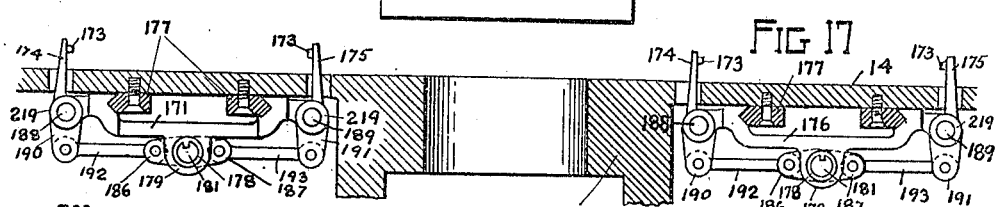
WITNESSES
Henry Salomonson
James Parker
INVENTOR
George A. Peterson
By Marcus A. Levé
His Attorney G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 9.
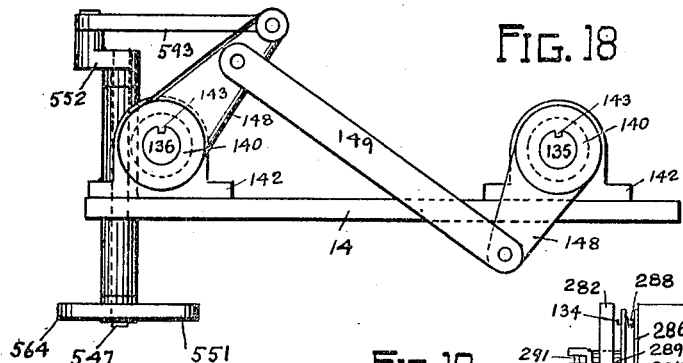
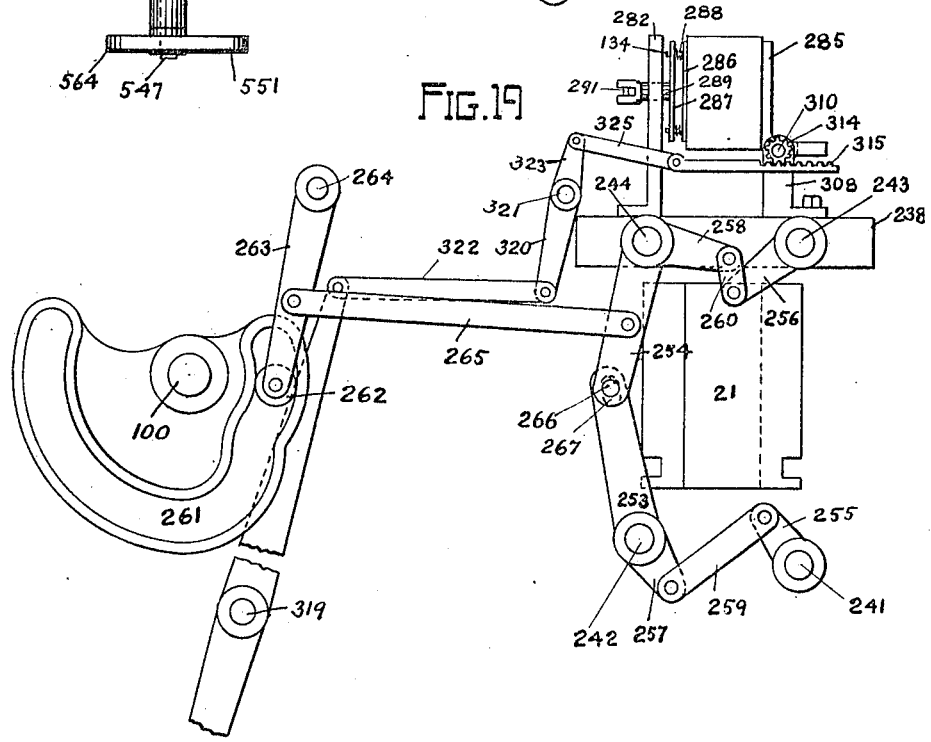
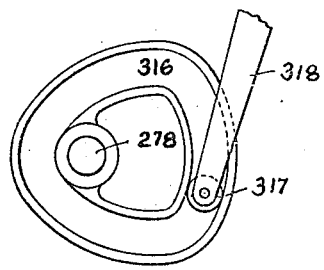
WITNESSES
Henry Salomonson
James Parker
INVENTOR
George A. Peterson
By Marcus S. Levé
His Attorney

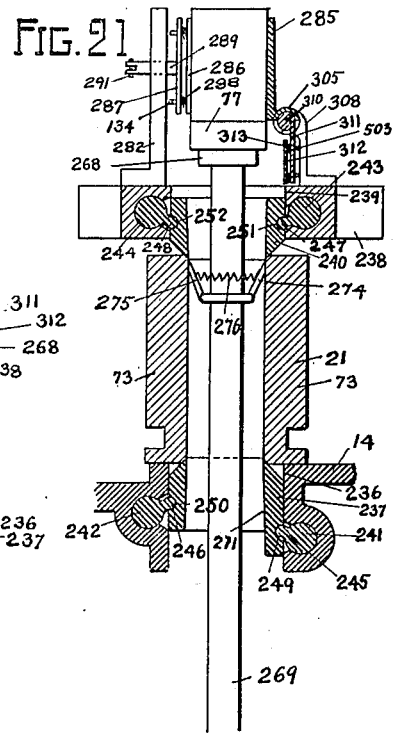

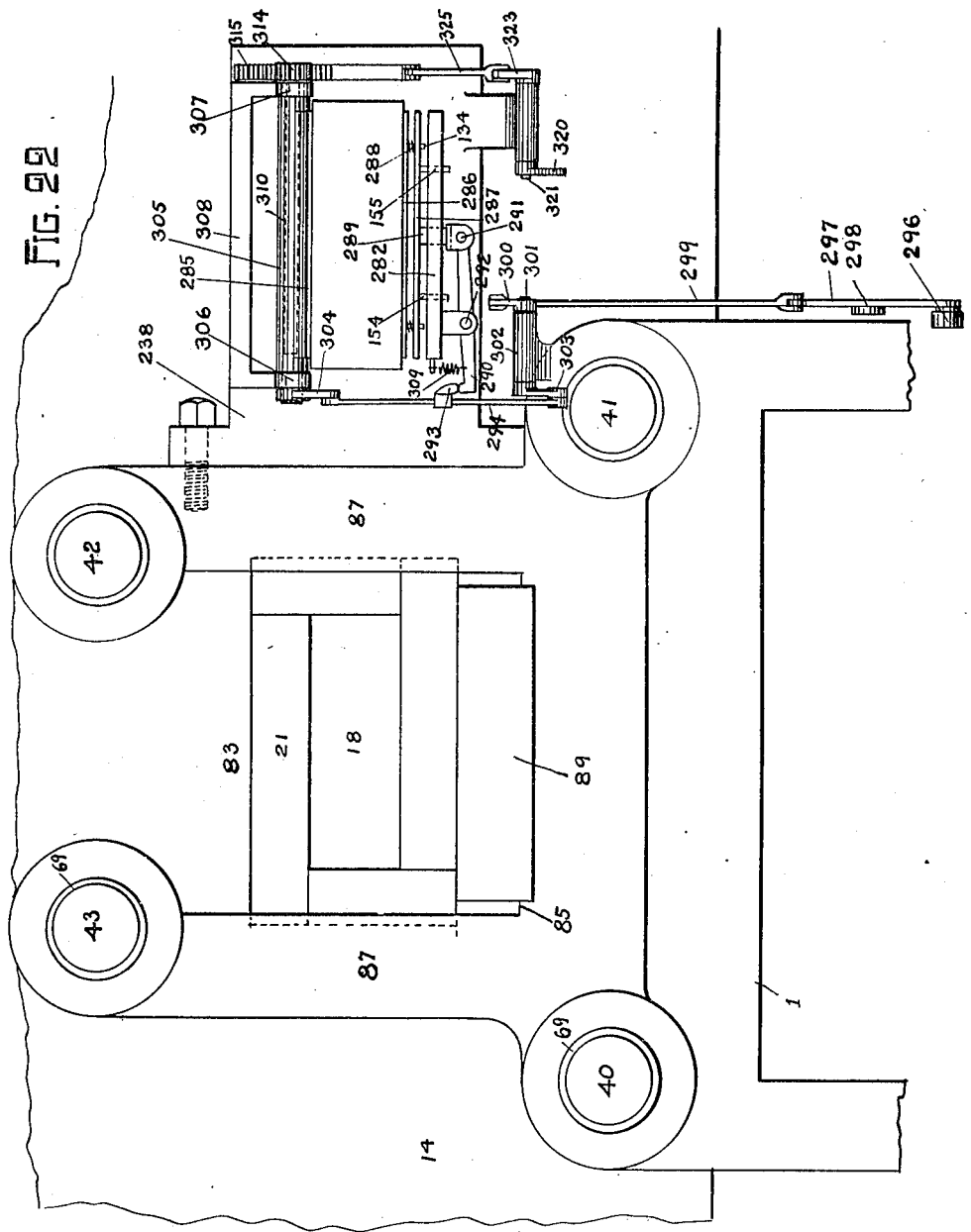

G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 12.
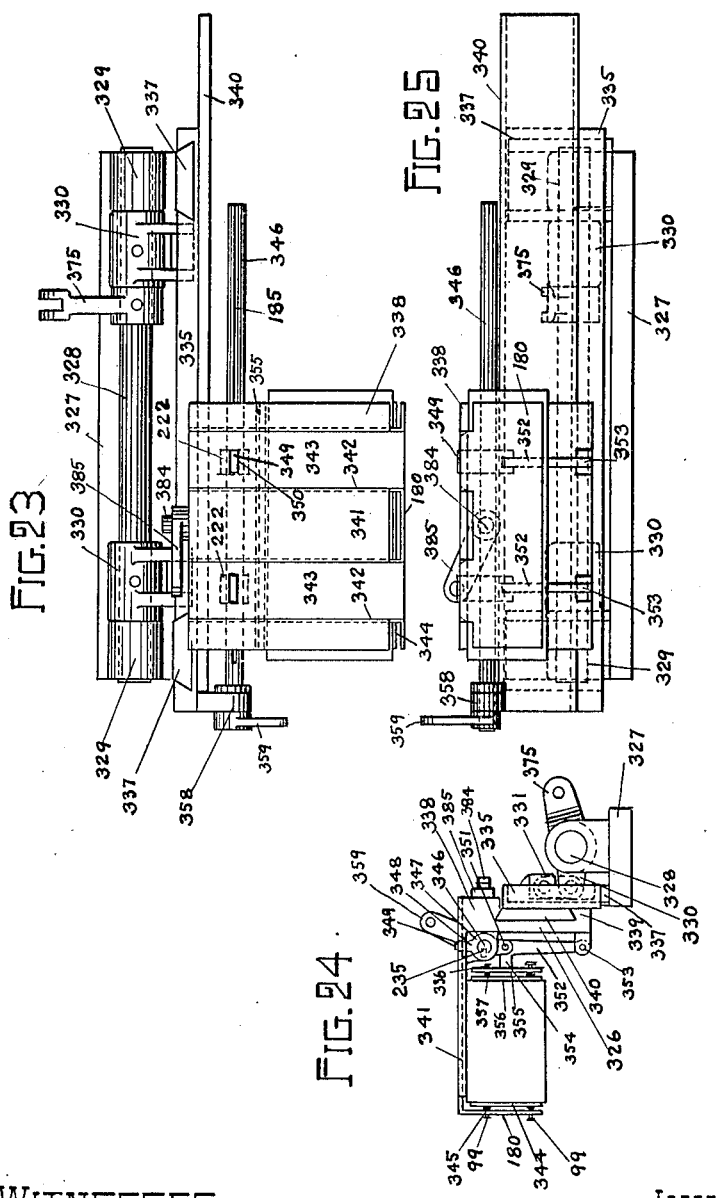
WITNESSES
Henry Salomonson
James Parker
INVENTOR
George A. Peterson
By Marcus S. Levé
His Attorney G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 13.
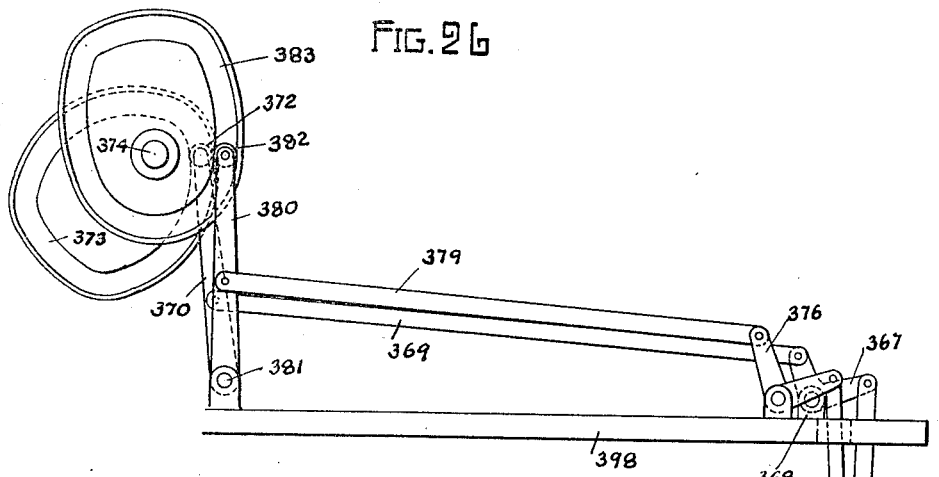
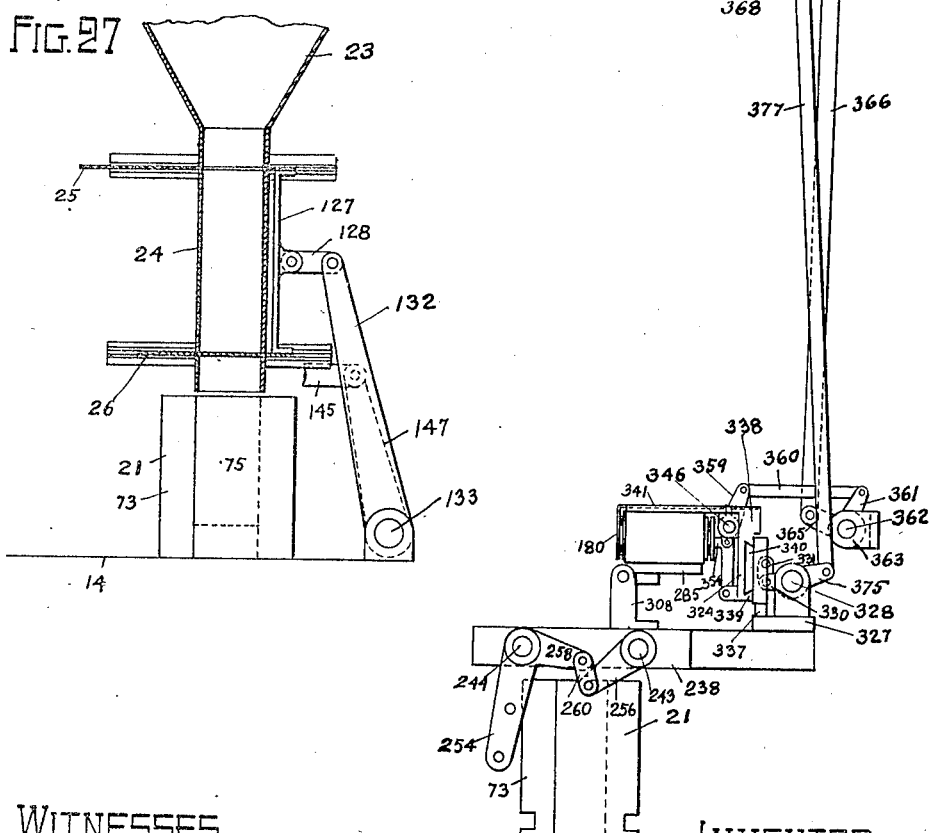
WITNESSES
INVENTOR
George A. Peterson
By Marcus S. Levé
His Attorney

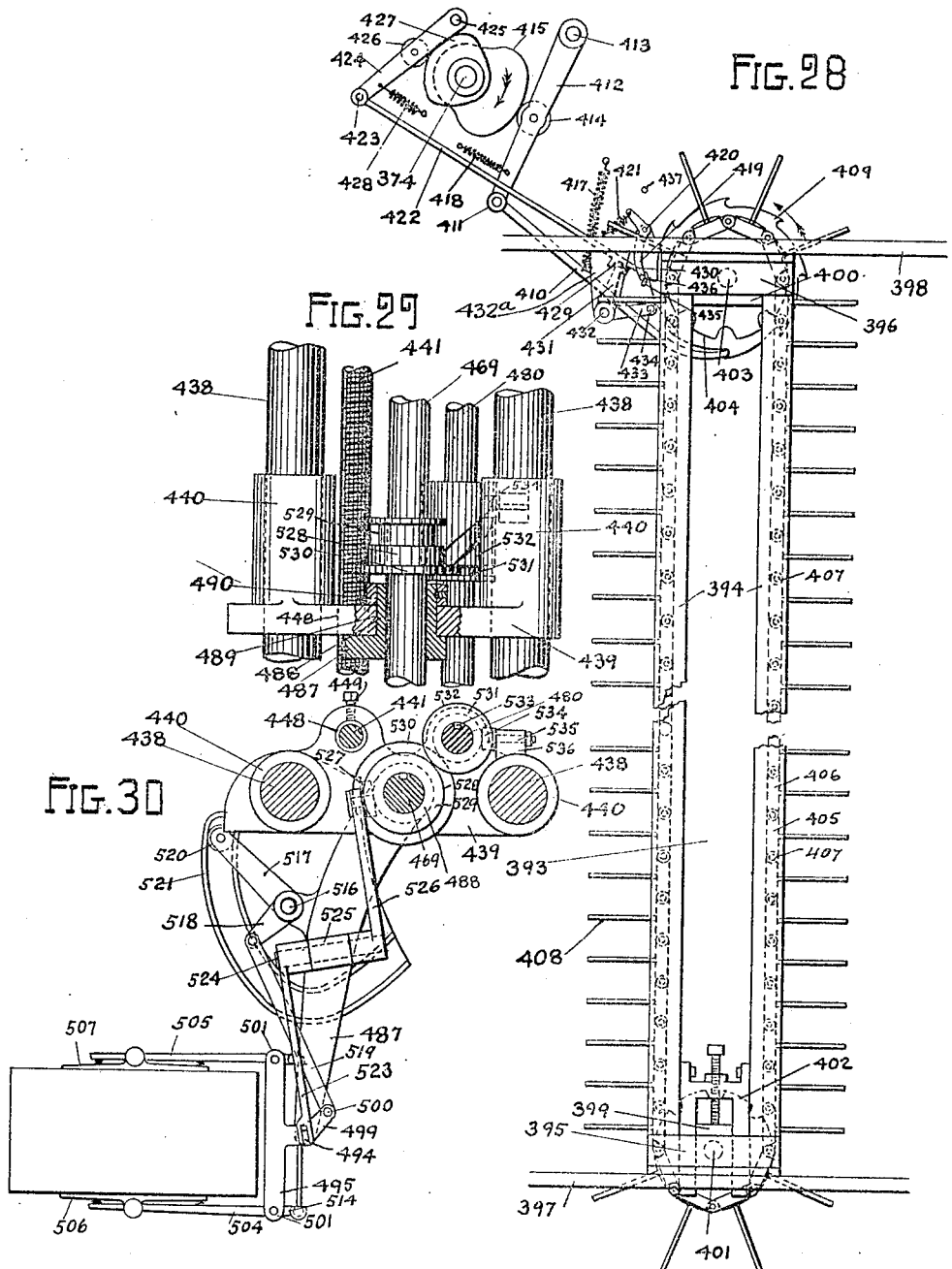

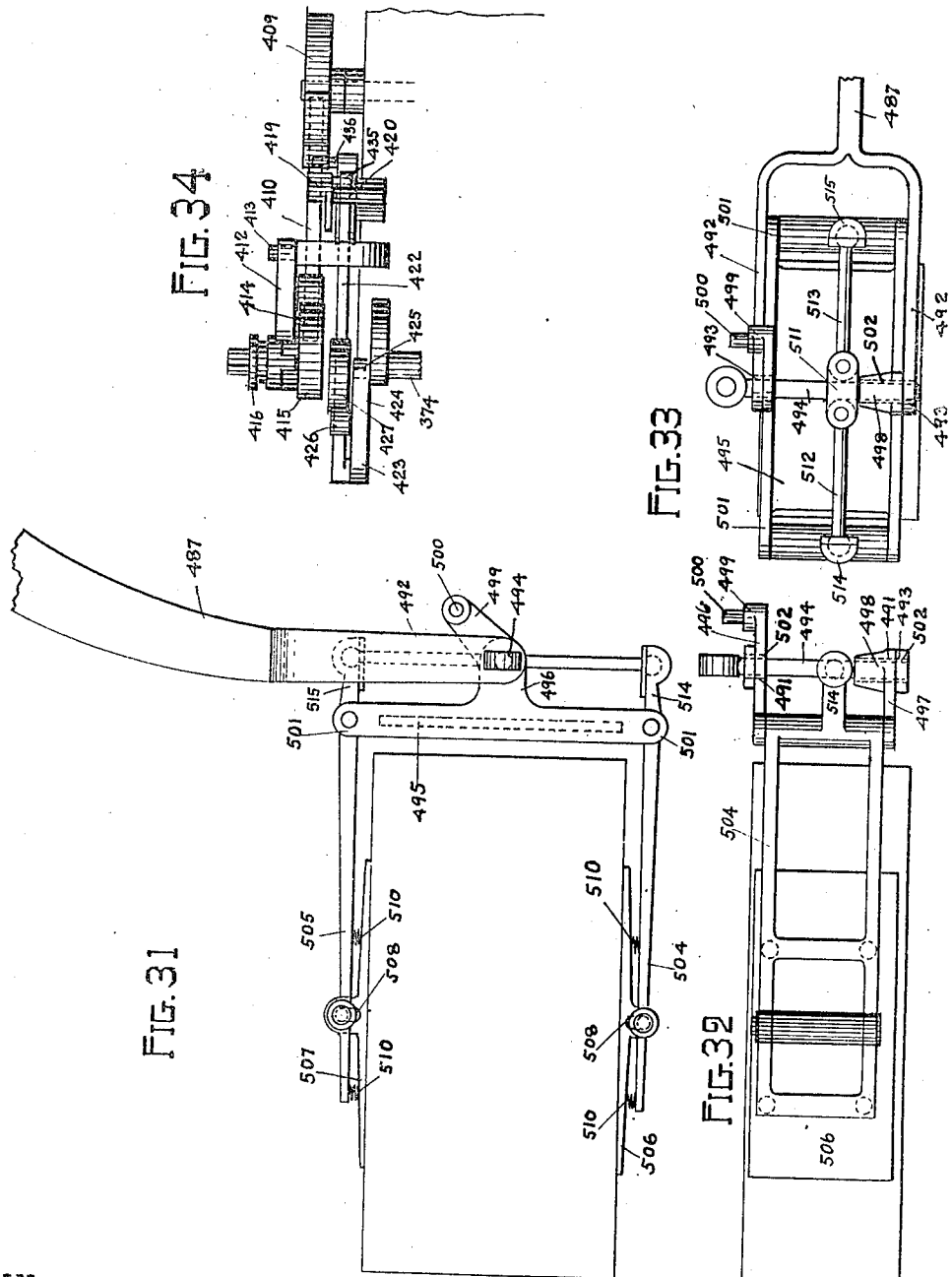

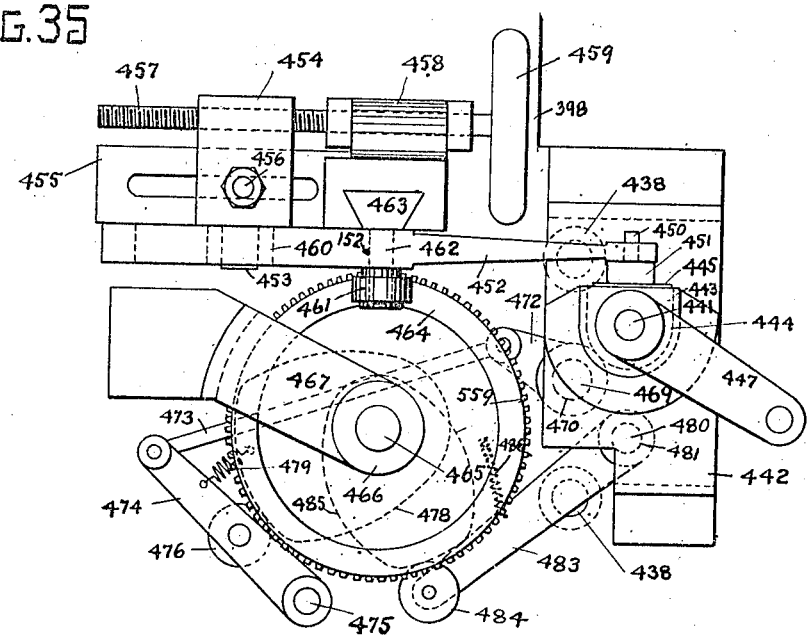
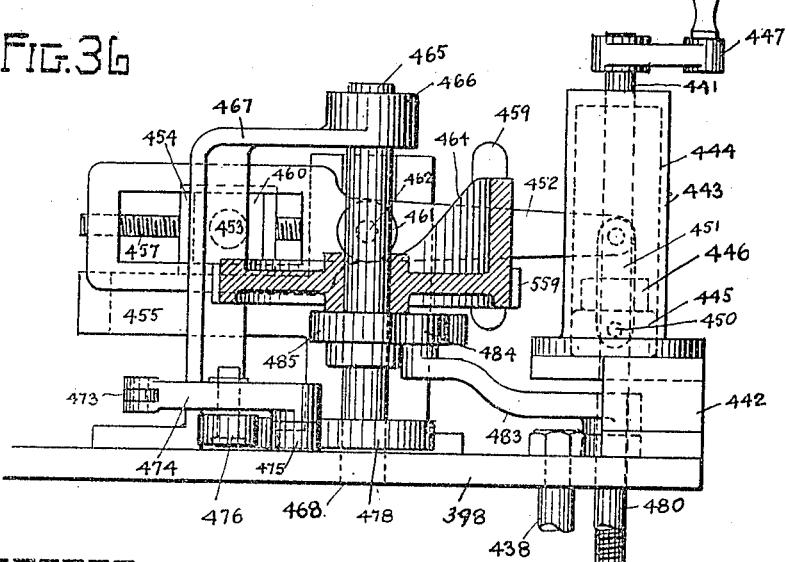

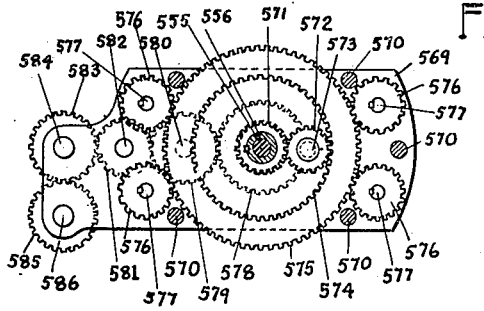
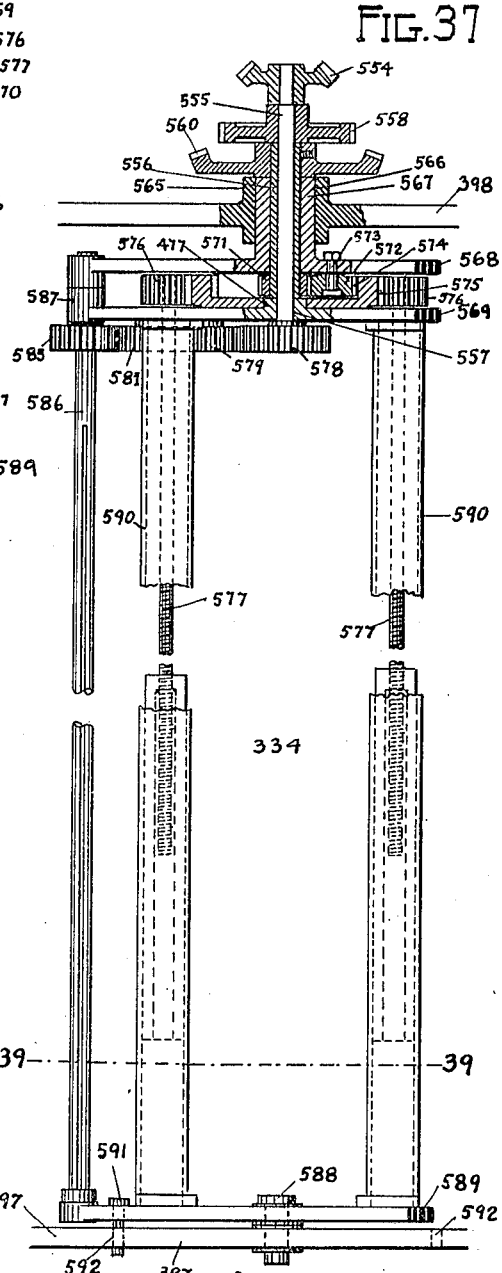

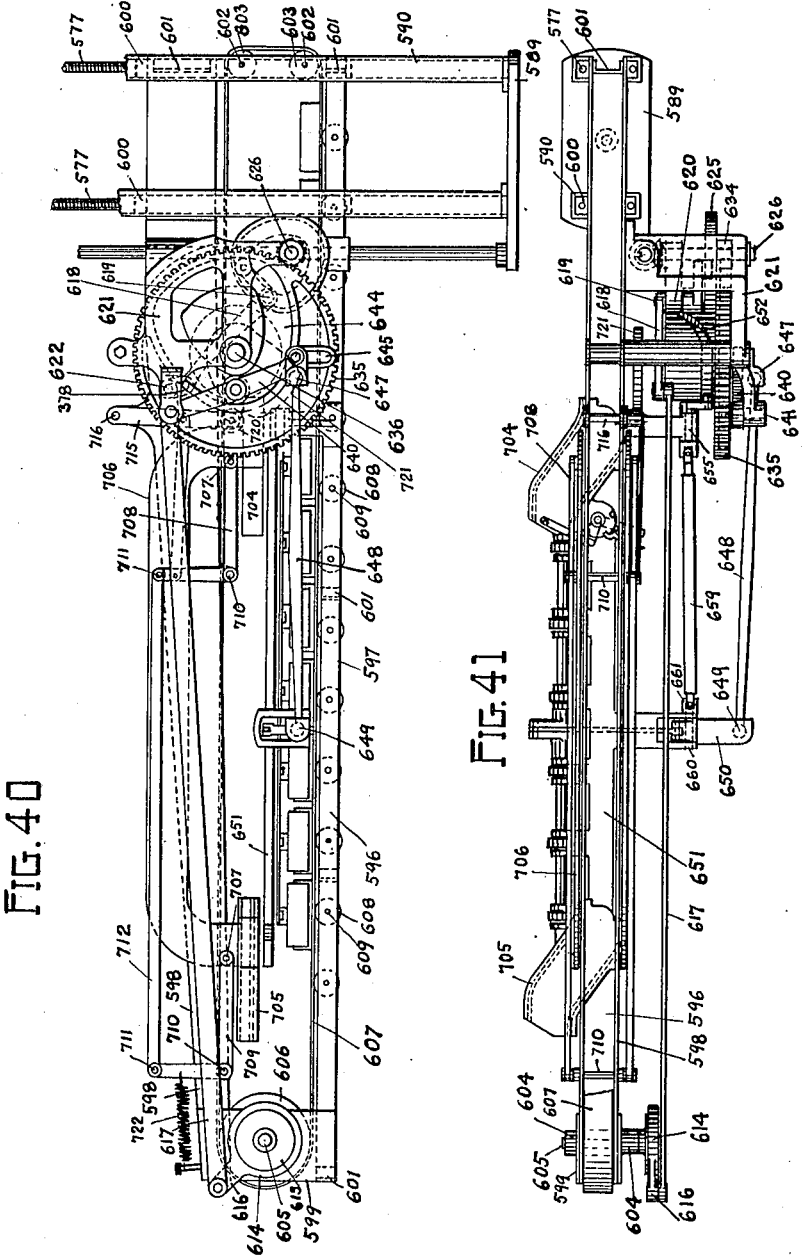

G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 19.
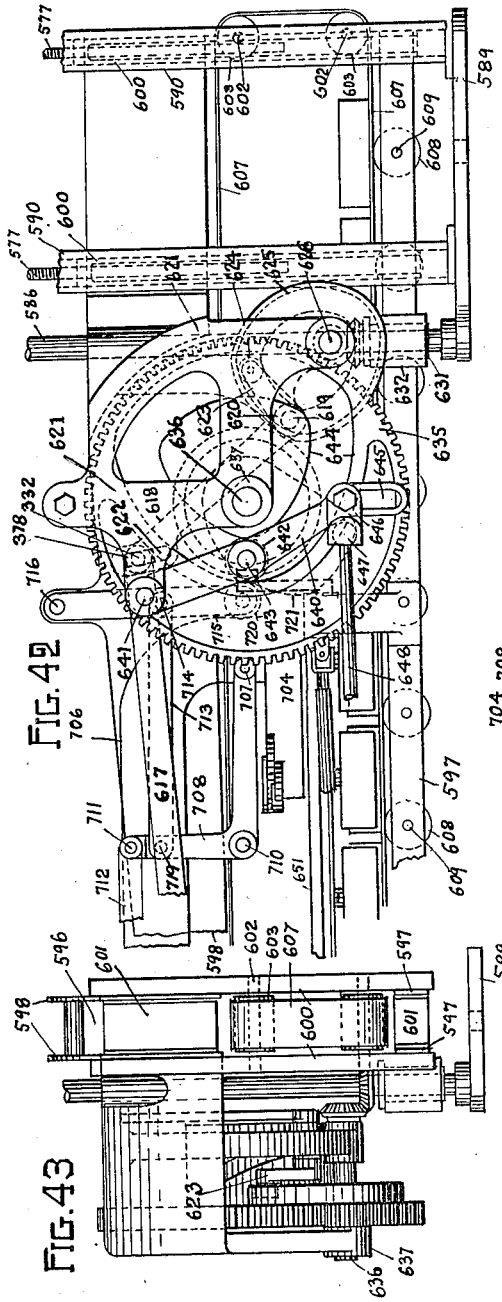
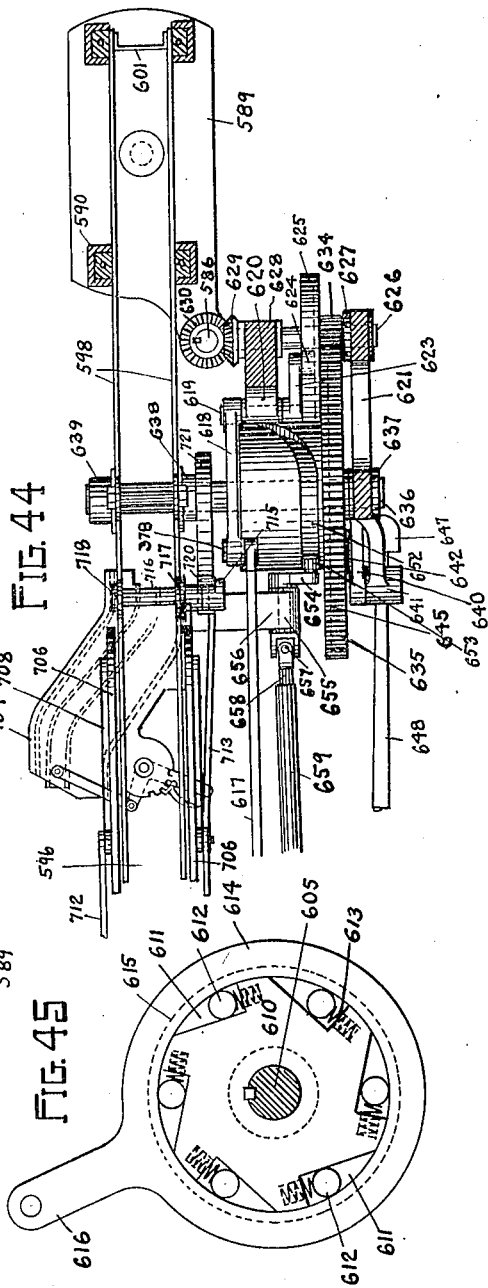
WITNESSES
Henry Salomonson
James Parker
INVENTOR
George A. Peterson
By Marcus S. Levé
His Attorney

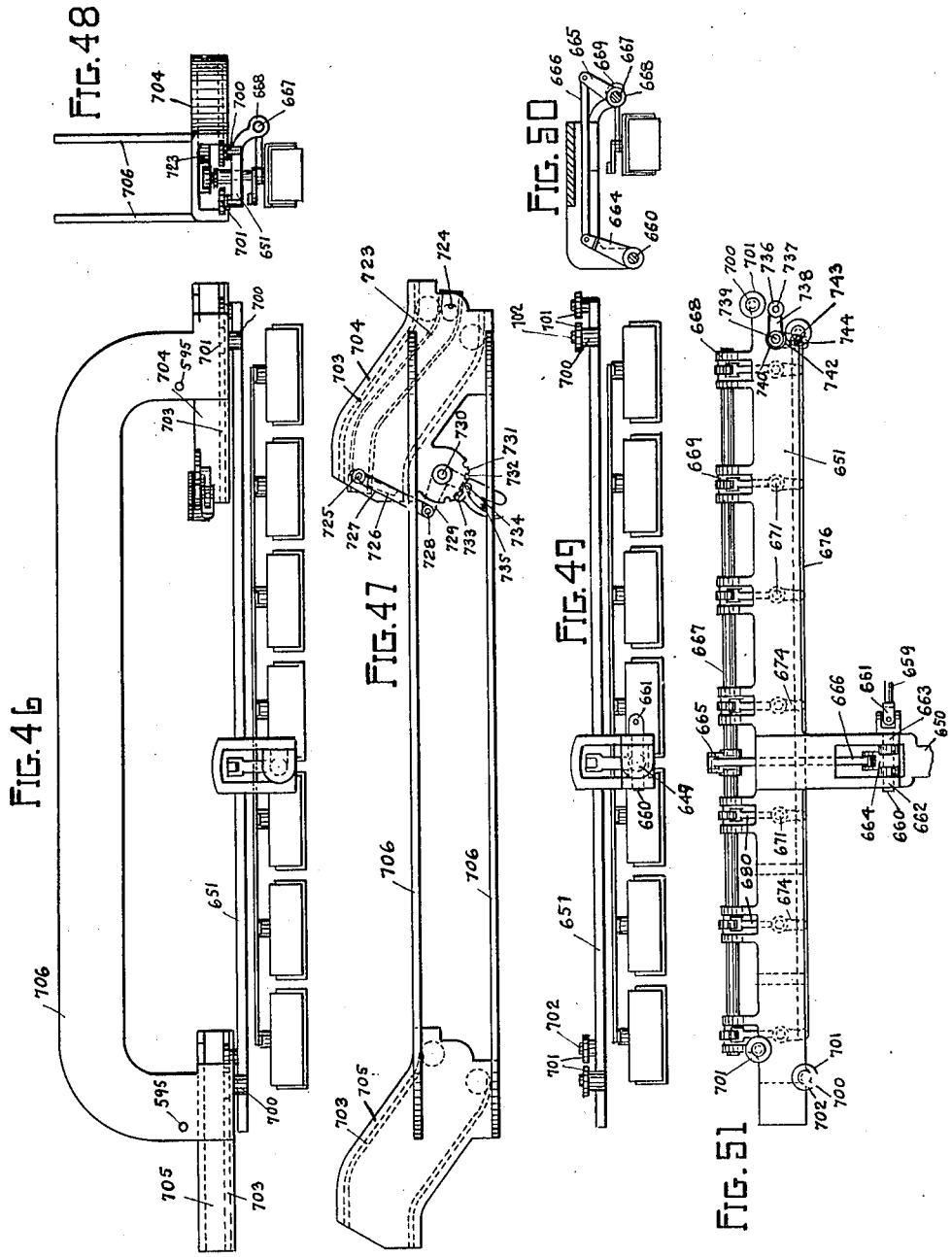

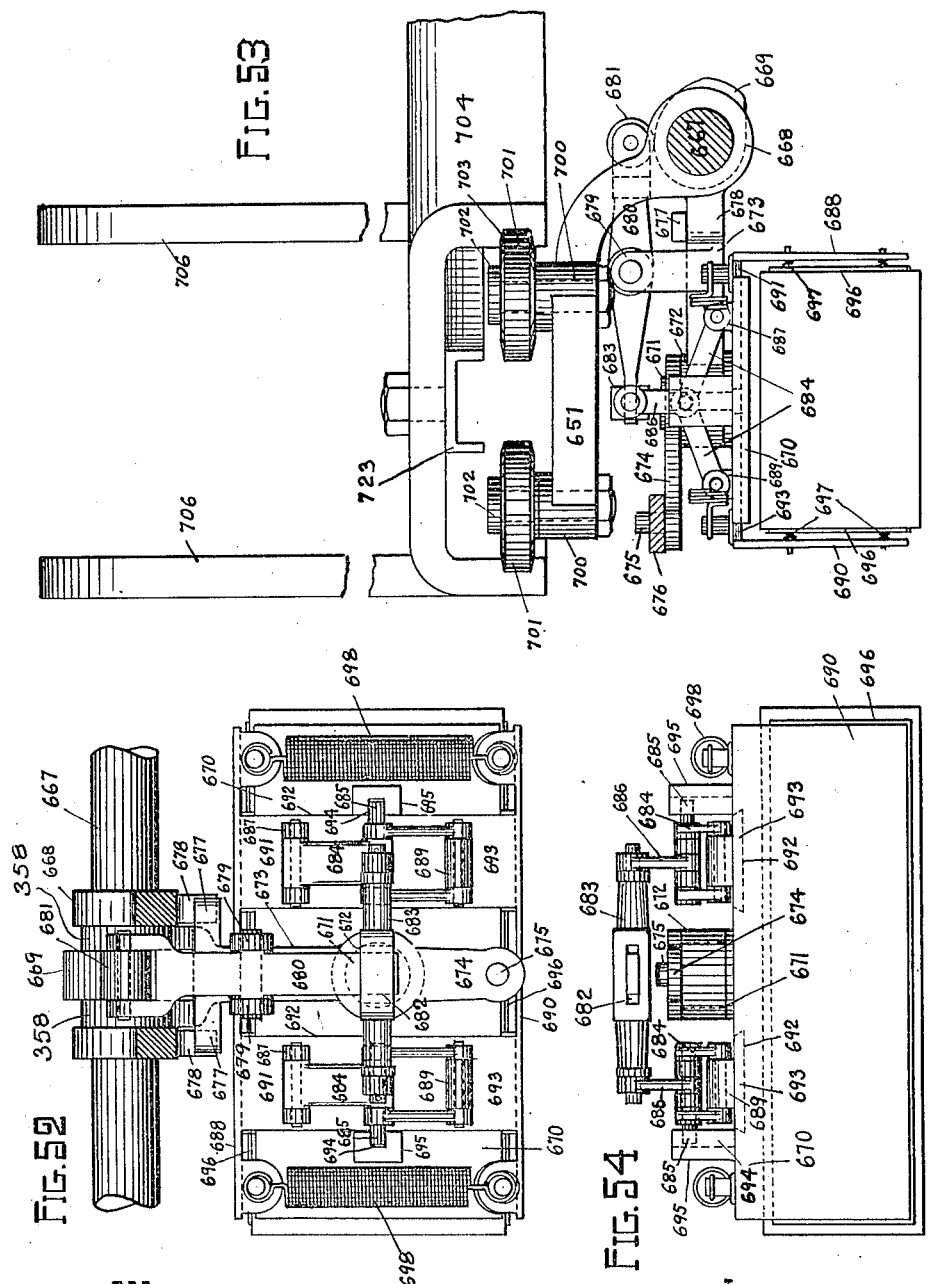

G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 22.
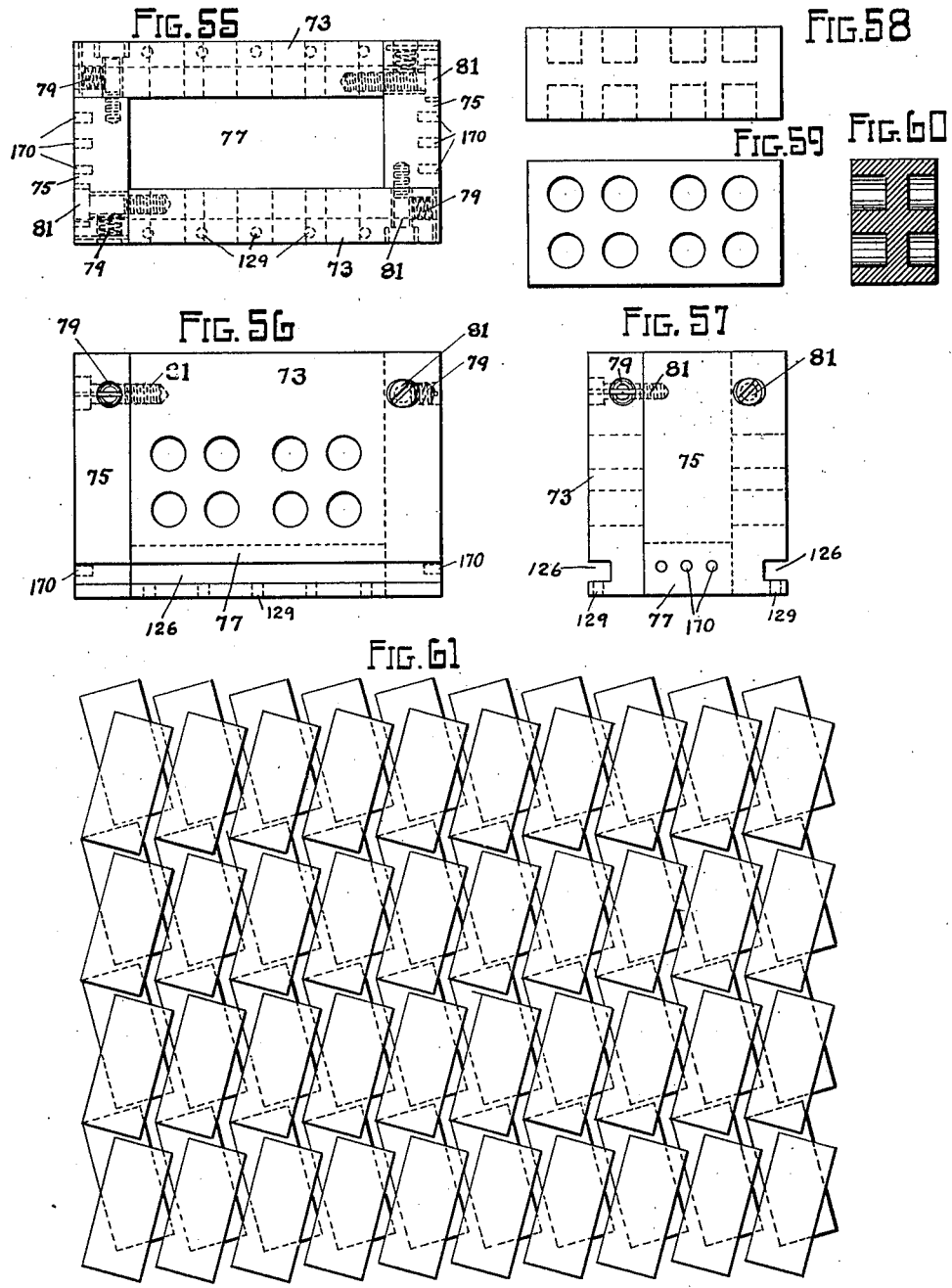

G. A. PETERSON.
BRICK MOLDING AND PRESSING MACHINE.
APPLICATION FILED FEB. 13, 1915.
1,292,869.
Patented Jan. 28, 1919.
24 SHEETS—SHEET 23.
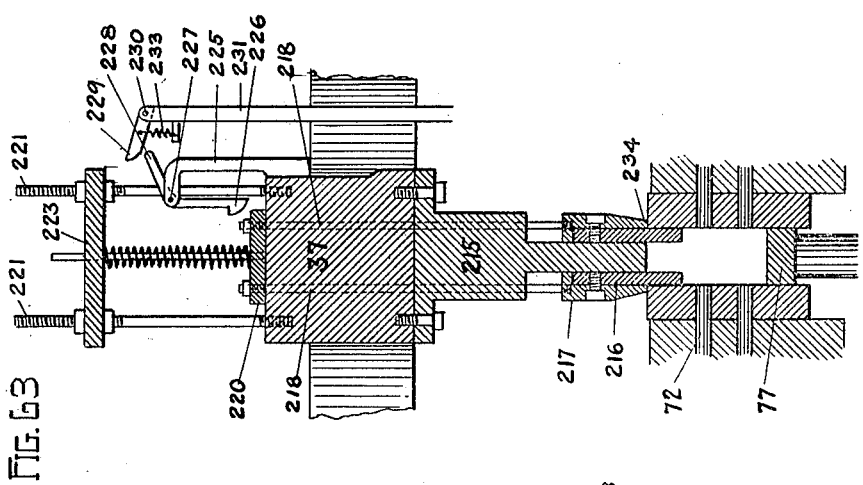
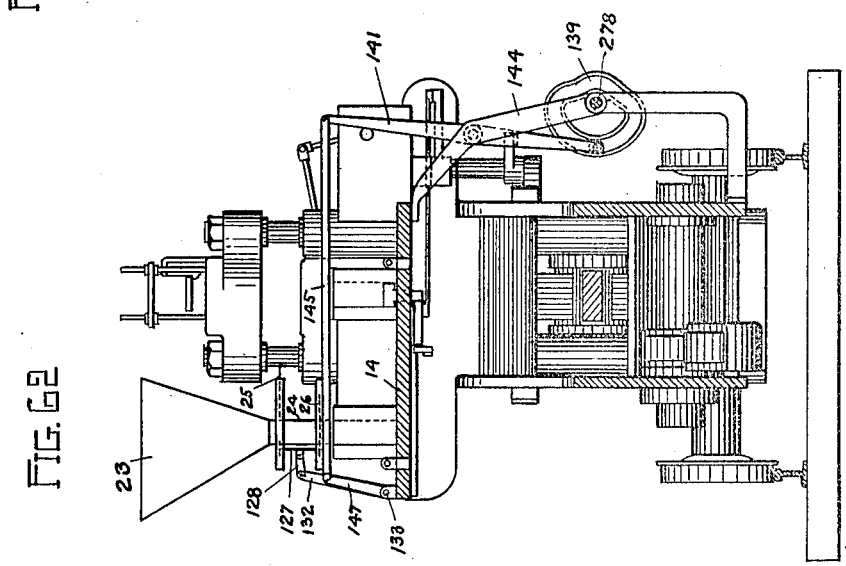
INVENTOR.
George A. Peterson,
BY Marcus S. Levi
ATTORNEYS.

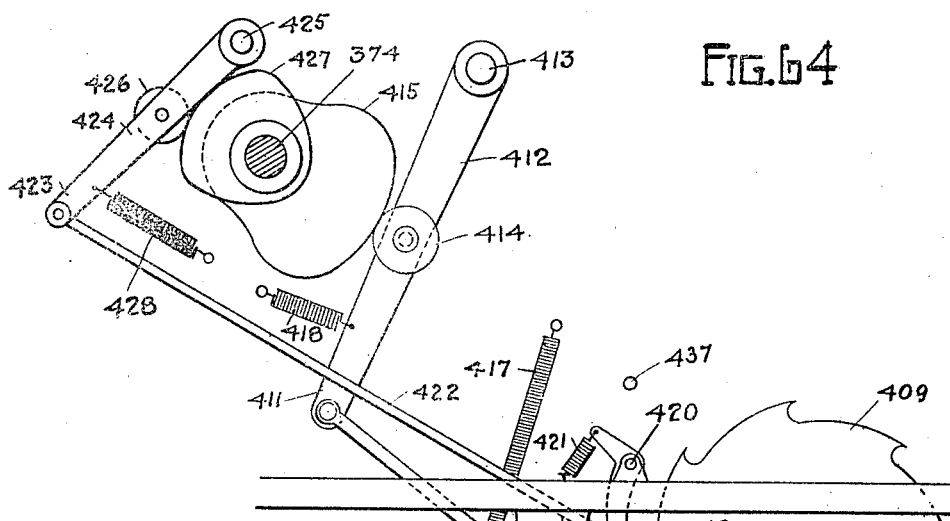
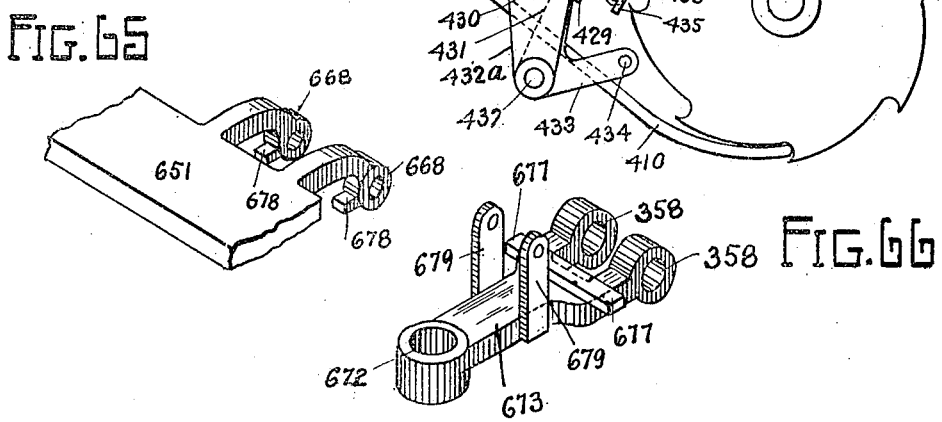

UNITED STATES PATENT OFFICE.

GEORGE A. PETERSON, OF OAKLAND, CALIFORNIA, ASSIGNOR TO UNIT BRICK AND STONE COMPANY, OF SAN FRANCISCO, CALIFORNIA, A CORPORATION OF CALIFORNIA.

BRICK MOLDING AND PRESSING MACHINE.

1,292,869.

Specification of Letters Patent. Patented Jan. 28, 1919.

Application filed February 13, 1915. Serial No. 8,091.

*To all whom it may concern:*

Be it known that I, GEORGE A. PETERSON, a citizen of the United States, residing at Oakland, in the county of Alameda and State of California, have invented a new and useful Brick Molding and Pressing Machine, of which the following is a specification.

This invention relates to machinery for molding and pressing bricks made of clay and more especially for molding and pressing bricks made of sand and cement or of crushed rock and cement.

It has for its object the production of mechanism which will work rapidly and which will form and press bricks of a better quality, regarding strength, than those produced by machines now in general use.

Another object is the production of mechanism which will form bricks of equal density and equal outside dimensions even when the material taken into the mold box to form said bricks varies in quantity.

The further object of this invention is to obviate the discoloration of the surface of the bricks due to the abrasion of the metal of the mold while said bricks are being pressed, and by the same means reduce the wear on the mold boxes.

Another object is to avoid any excessive strains on the pressing mechanism, when a quantity of material more than required to form a brick is taken into the mold box.

The further object is to save the labor of removing the bricks from the machine by providing mechanism for such a removal and for the piling of said bricks in regular stacks along the yard.

Before describing in detail my invention I will first state in general terms the method of operation I follow and the manner in which I proceed in order to produce an improved machine for the purpose stated.

The machine is chiefly intended for molding, pressing and piling bricks made of sand and cement or of crushed rock and cement.

The bricks are made of the ordinary rectangular shape and of the standard outside dimensions and are provided on one or on both of the flat sides with a number of depressions or cavities put there for several purposes. One of the objects of the said cavities is to facilitate the drying or seasoning of the bricks and to prevent the cracking of the same while being seasoned. Another object is to increase the binding of the several layers of brick by forming anchor holes in said bricks to be filled up later with mortar when laid in the wall. The further object is to make it possible to produce bricks of the same outside dimensions and of the same density when the volume of material used in molding said bricks varies, by varying the depth of said cavities accordingly.

The several materials which are used in the formation of bricks are previously prepared outside of the machine and are delivered by hand into proper hoppers or containers to be fed out automatically into a number of mold boxes which are arranged to travel with an intermittent motion over an endless rectangular path provided with a number of stations, where the said mold boxes remain at a stand-still for an interval of time. At one of said stations is located the hopper supplying the material forming the facing of the brick, at another station is placed the hopper supplying the coarser material forming the backing or body of the brick; at a third station the pressing of the bricks is done and at a fourth station the molds are opened, the bricks removed and the mold boxes cleaned and made ready to receive the material to form other bricks. From this station the mold boxes continue to move along their endless rectangular course back to the place started, while the bricks become subject to the action of the piling mechanism which receives the bricks as they leave the mold boxes, elevate or lower them from the elevation at which they were formed and bring them to be just above the elevation which they will occupy when in the pile. The bricks are then fed one by one and distributed in a line upon a piling arm where they are taken hold of by the proper mechanism and placed in the proper position on the pile, forming a row of bricks. The machine is then advanced along the ground for the proper distance and when another line of bricks is placed on the pile it will form another row. This operation will continue until one complete layer of bricks will be piled. The machine is then moved back to the commencement of the pile and is adjusted so as to place the bricks upon said pile at a higher elevation; another layer is thus built up upon the pile, and the operation is repeated until a whole pile of the desired height is completed.

Having thus briefly stated the nature of my invention, I will now describe at length the manner in which I proceed to apply and carry out the same in the production of an improved machine for the purpose stated, reference being had to the drawings that accompany and form a part hereof.

Fig. 4 is a top plan of the machine with the piling arm broken away.

Fig. 5 is a plan of the machine with the top plate removed so as to show some of the mechanism below.

Fig. 6 is another plan with the table removed.

Fig. 7 is a plan similar to Fig. 6 with some of the mechanism removed so as to show clearer the parts below.

Fig. 8 is a sectional plan taken through the cam shaft.

Fig. 9 is a detail of the hydraulic safety device applied to the connecting rod actuating the pin operating toggles, shown in section.

Fig. 10 is a detail of the draw rods and gripping mechanism employed to move the mold boxes longitudinally along the rectangular path.

Fig. 11 is a cross section of the same mechanism taken on line 11—11 of Fig. 10.

Fig. 12 is a detail of one of the draw rods showing the grippers for engaging the mold boxes.

Fig. 13 is a detail of the block engaging the draw rods.

Fig. 14 is a cross section through the turning sleeves employed for actuating the grippers of the draw rods.

Fig. 15 is a longitudinal section through the same turning sleeves.

Fig. 16 is an enlarged sectional plan of a portion of the machine showing the mold chamber where the mold box is clamped, the cavity forming pins and the carriages for moving the mold boxes over the rectangular path across the machine.

Fig. 17 is a section through line 17—17 of Fig. 16.

Fig. 18 is a detail showing the connection of the draw rods with the actuating mechanism.

Fig. 19 is a side view of the mechanism for opening the mold boxes for the removal of the bricks and for tilting the brick so as to bring it to rest upon the flat side; Fig. 20 is a sectional elevation of the same, and Fig. 21 is a similar section of the upper portion of the mechanism shown in Fig. 20, drawn to a large scale.

Fig. 22 is a plan of the brick tilting mechanism showing its location in the machine in relation to the press.

Fig. 23 is a plan, Fig. 24 an end view and Fig. 25 a front view of the carriage for transporting the bricks from tilting mechanism onto the elevator.

Fig. 26 is a side elevation showing the connection of the transporting carriage with the actuating cams.

Fig. 27 is a cross section of one of the hoppers showing the gates operating to measure out the volume of material to be fed into the mold boxes.

Fig. 28 is a detail of the elevator which raises or lowers the bricks so as to bring them to the level they occupy in the pile.

Fig. 29 is a side elevation and Fig. 30 is a plan of the sliding frame and transporting arm employed for transferring the bricks from the elevator to the distributing arm.

Fig. 31 is a plan, Fig. 32 is a side elevation and Fig. 33 an end view of the gripping mechanism carried by the transporting arm.

Fig. 34 is a plan of the mechanism for driving the elevator.

Fig. 35 is a plan and Fig. 36 a sectional elevation of the mechanism actuating the transporting arm.

Fig. 37 is a side elevation partly in section and Fig. 38 a plan of the frame for carrying the distributing and piling arm.

Fig. 39 is a section through line 39—39 of Fig. 37.

Fig. 40 is a side elevation and Fig. 41 a plan of the distributing and piling arm.

Fig. 42 is a side elevation, Fig. 43 an end view and Fig. 44 a plan of the operating mechanism of the distributing and piling arm, drawn to an enlarged scale.

Fig. 45 is a detail of the inside mechanism of the noiseless ratchet.

Fig. 46 is a side elevation of the piling arm.

Fig. 47 is a plan of the same arm with the gripper frame removed.

Fig. 48 is an end view of the piling arm.

Fig. 49 is a side elevation, Fig. 50 a sectional side view and Fig. 51 a plan of the gripper frame.

Fig. 52 is a plan of one of the grippers carried by the gripper frame drawn to a large scale.

Fig. 53 is an end view of the gripper, the gripper frame and part of the piling frame.

Fig. 54 is a side elevation of a gripper.

Fig. 55 is a plan, Fig. 56 a side elevation and Fig. 57 an end view of a mold box.

Fig. 58 is a plan, Fig. 59 a side elevation and Fig. 60 a cross section of a brick molded and pressed in the machine.

Fig. 61 is a plan of a pile of bricks as they are stacked by the machine, showing the method of piling.

Fig. 62 is a cross section through the machine taken on line 62—62 of Fig. 4 showing the mechanism actuating the sliding gates in the discharge tubes of the hoppers.

Fig. 63 is a detail of the mechanism actuating the outer lining of the top plunger, showing the application of pressure to the outer edge of the top surface of the brick before any pressure is applied to the rest of said surface.

Fig. 64 is an enlarged detail of the mechanism actuating the elevator.

Fig. 65 is a perspective view of a portion of the gripper frame, showing the bearings for the cam shaft and the projections for supporting the gripper arms.

Fig. 66 is a perspective view of one of the gripper arms.

Figure 1:
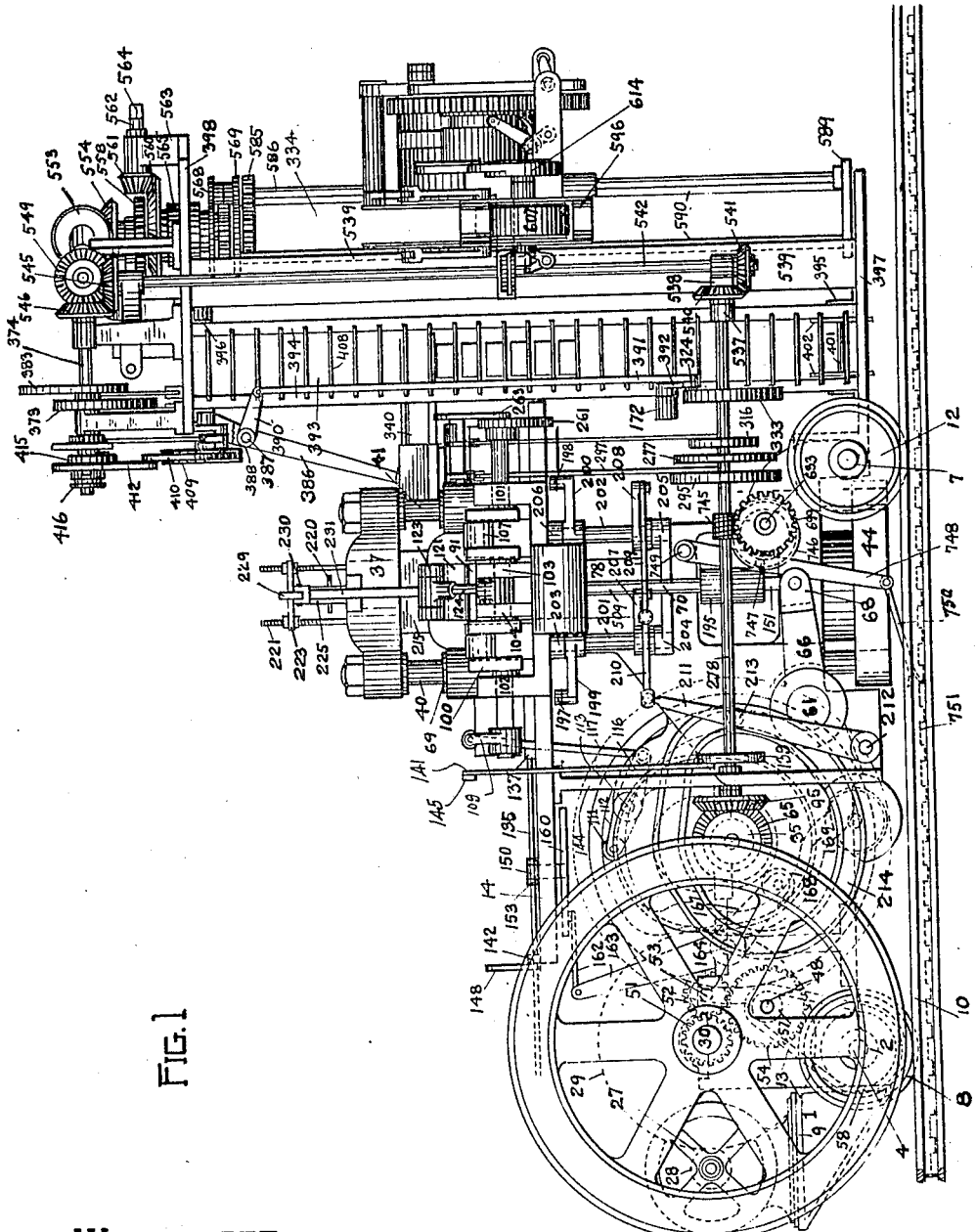
Figure 1 is a side elevation of the machine.

For convenience of describing the principal parts of this machine, they are designated herein by numerals.

1 is the main frame of the machine. It is provided with the bearings 2 and 3 to receive the rear axle 4 (Fig. 7), and with the bearings 5 and 6 to receive the front axle 7. Track wheels 8 are rigidly secured to the said rear axle, and are spaced to correspond with the gage of a track formed by a pair of rails 10, laid along the ground in the yard, or in the shed where the bricks are to be stacked in piles. Wheels 12 are similarly secured on the front axle 7, in order to support the front of the machine.

The machine is thus made portable, and may be moved from one part of the yard to the other when required.

The machine (as shown in Figs. 1, 2, 4, 6 and 7) is driven by an electric motor 27, which is mounted on a bracket 9, secured to the main frame 1. The motor supplies the power to operate the several parts of the machine, and also to move the machine from place to place. A pinion 28 carried by the motor shaft 30 is made to engage a gear 29 which is rigidly secured to a driving shaft 30, mounted in the bearings 31 and 32 on the main frame 1.

The gearing for transporting the machine from place to place along the track (while doing no work) is best shown in Figs. 1, 2, 4, 5, 6, 7 and 8, and consists of the pinion 46, keyed to the driving shaft 30, engaging a gear 47, loosely fitted to a clutch shaft 48, which is mounted in the bearings 49 and 50 on the main frame (shown in Figs. 7 and 8). Another pinion 51, also keyed to the driving shaft 30, engages the idler pinion 52, (see Figs. 1 and 6) working on a pin 53, and meshing with the gear 54, fitted loosely on the clutch shaft 48. The said gears 47 and 54 are thus driven to turn in the opposite directions; the gear 47 being driven in the same direction as the motor, and the gear 54 in the opposite direction.

The clutch shaft 48, best shown in detail in Fig. 8, carries the cone friction 55, adapted to engage the conical interior of the gear 47, and the cone friction 56, adapted to engage the conical interior of the gear 54. The said cone frictions are firmly secured to the clutch shaft 48, and are so spaced along said shaft as to be somewhat closer together than the distance between said gears, thus permitting a lateral sliding motion of the clutch shaft in either direction. A shifting lever 11 is arranged in the usual manner to slide the clutch shaft 48 either to the extreme right, causing the cone 55 to engage the gear 47, so as to revolve the said clutch shaft in the same direction as the motor, or to the extreme left, causing the same friction cone 55 to disengage the gear 47, and the cone friction 56 to engage the gear 54, so as to revolve the clutch shaft 48 in the opposite direction to that of the motor. When the shifting lever is brought to the middle position, both cone frictions become disengaged from the gears 47 and 54 and the clutch shaft 48 remains at rest.

A sprocket wheel 57 is secured to the clutch shaft 48, and another sprocket wheel 58 is secured to the rear axle 4, and both said sprocket wheels are connected together by the sprocket chain 13, thus gearing the rear axle 4 with the clutch shaft 48, and causing the machine to remain still, or to travel in one direction or in the other, according to whether the clutch shaft 48 remains idle, or is turning in one or in the other direction.

The following is a description of that portion of the machine which is designed for molding and pressing the bricks.

A table 14 (shown in Figs. 4 and 5) mounted on the frame 1 is provided with a number of stations, 15, 16, 17, 18, 19 and 20, arranged on a closed rectangular path and over said path six molding boxes 21 are made to travel intermittingly from one station to the other. When the several mold boxes come to a stop at some of the above stations certain work is being performed upon said mold boxes or upon the material there contained to further advance the completion of the bricks.

At station 15 the material forming the face of the bricks, which usually contains coloring matter, is fed into the molds; at 16 the backing consisting of coarser material is fed into the mold boxes; 17 is an idle station; at 18 the pressing is done; at 19 the molds are opened, the bricks discharged and the molds cleaned; and 20 is an idle station.

The mold boxes (shown in detail in Figs. 55, 56 and 57) are made up of a number of metallic plates; the plates 73 form the sides, while the plates 75 form the ends and the plate 77 the bottom. The said sides and ends are arranged as shown and are held together yieldingly by the springs 79 and are made to register one with the other by the studs 81. Above the stations 15 and 16 are secured the hoppers 22 and 23 which contain the material for forming the bricks.

The hopper 22 carries fine material, containing coloring matter which is used to form the facing of the brick and which material is fed first into the mold box in a thin layer while the hopper 23 carries the coarser material for forming the main body of the brick. Both of the said hoppers are open at the bottom where they carry the discharge tubes 24 which have the form of cross section and the inside dimensions the same as the mold box.

The mechanism for measuring the brick material before it is fed into the mold boxes is illustrated in Fig. 27 and Fig. 62.

Two sliding gates 25 and 26 are fitted in proper slides at a greater or less distance one above the other according to the volume of material desired to feed into the mold boxes at a time.

The said gates 25 and 26 are both made of a length equal to twice the width of the discharge tube 24 and are secured together by the cross plate 127 so as to be operated by a single link 128 connecting the cross plate with the lever 132.

The gates 25 and 26 are so arranged as to cause the gate 26 to close the discharge tube 24 and the gate 25 to open the same, thus causing the tube to become filled with material from the hopper 23 above when the lever 132 is swinging in one direction, and to close the gate 25 and open the gate 26, thus discharging a measured quantity of material into the mold box below, when the lever 132 is swinging in the opposite direction. A measured quantity of material is thus first filled into the mold box from the hopper 22 containing the material forming the facing of the brick, and then another measured quantity of material is filled into the mold box from the hopper 23 to form the backing or body of the brick.

The lever 132 is secured to a shaft 133 which is mounted in proper bearings on the top of the table 14, and which is caused to oscillate forward and backward by a cam 139 on the shaft 278 actuating a lever 141, which is pivoted to a bracket 144, and which engages by means of the link 145 a lever 147 carried by the shaft 133.

After leaving the station 16 the mold box comes to a stop at the idle station 17 and from there in the next move it is brought to the station 18 where the pressing mechanism is located (see Figs. 2, 3, 5 and 16). There a mold chamber is formed above the table 14 in order to inclose and clamp tightly the mold boxes, thus preventing the spreading or the outward bending of the sides of the molds while the bricks are being pressed.

The mold chamber consists of the upright walls 83 and 85 projecting above the table 14 and joining together at the top by the bridges 87. At the ends of the upright walls 83 and 85 two doors or gates 96 are fitted to slide horizontally in the guides 98 on the frame 1, and a crank shaft 100 is fitted in the bearings 101, 102, 103 and 104 on the main frame and connecting rods 105 are made to join the said gates with the crank pins 107 of the crank shaft 100. A lining 89 made of a wedgy cross section is slidably fitted at the inner side of the upright wall 85 of the mold chamber; the lowering of said lining will cause its inner face to move toward the other wall 83 and thus clamp the mold box tightly. The lining is provided at the top with a pocket 118 carrying a block 119 adapted to engage the end 120 of the lever 121, which is fulcrumed at 122 to a bracket 91 secured at the top of the upright wall 85 of the mold chamber; the other end 123 of the said lever is joined by the connecting rod 124 with the crank pin 125 of the crank shaft 100. When a mold box arrives at the station 18, the shaft 100 is turned causing the gates 96 to become closed and the wedgy lining 89 to be lowered, thus clamping tightly the mold box on all the sides, and causing it to register with the upper mechanism of the press acting upon the material inside said mold.

To actuate the crank shaft 100 a cam 110 (best shown in Figs. 2, 5 and 6) is placed inside the gear 34, engaging a roller 111 carried at the free end of an arm 112 secured on a rocking shaft 113 which is mounted in the bearings 114—115 on the main frame. An arm 116 secured to the rocking shaft 113 connects with an arm 109 on the crank shaft 100 by means of the connecting rod 117.

The press consists of a bottom plunger 36 and a top follower 37, both arranged in alinement and adapted to move in opposite directions. The bottom plunger 36 is guided in the cylindrical bore 67 in the frame 1, while the top follower is secured to four rods 40, 41, 42 and 43 guided in the bushings 69 on the main frame 1 and held together at the bottom by the sliding block 44.

The press is operated by a crank shaft 35 carrying a gear 34 driven by the pinion 33 which is held on the driving shaft 30 by the clutch 71. The crank pin 108 of the crank shaft 35 engages by means of a connecting rod 45 the two struts 38 and 39 of a toggle (Fig. 2), the strut 38 joining with the plunger 36 and the strut 39 connecting with the sliding block 44. While the toggle is being moved from the position of the dead center, where the said struts are on a straight line, to a position where they form a broken line, the bottom plunger 36 and the top follower 37 are being moved apart, thus releasing the pressure, and when said toggle is being moved toward the dead center, the said bottom plunger and the said top follower are being brought closer together, thus increasing the pressure in the press.

Figure 2:
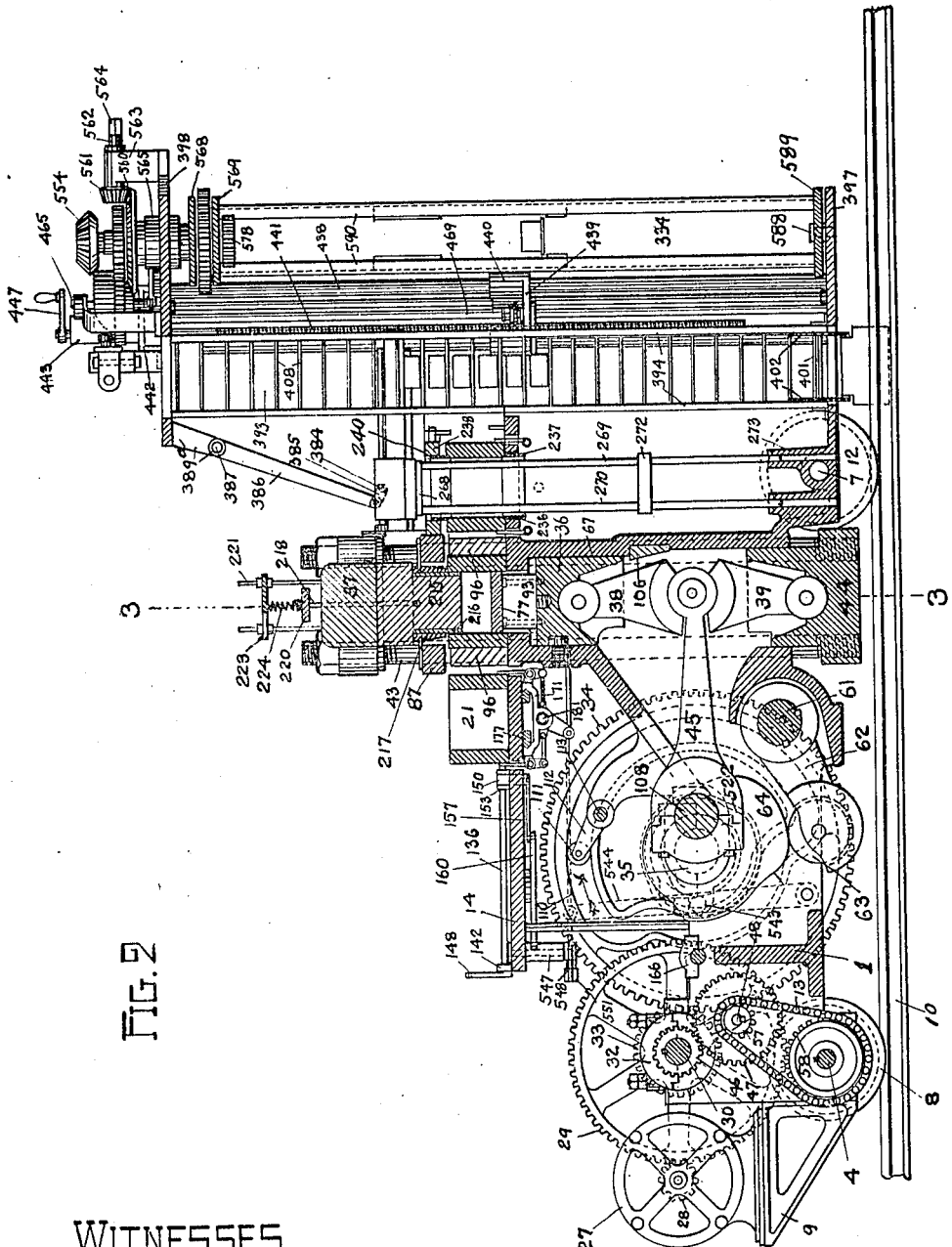
Fig. 2 is a longitudinal section taken through the middle of the press.

The bottom plunger 36 carries at the middle of its upper face a block 93 (see Figs. 2 and 3) which passes through an opening 97 in the table 14, and enters the mold box from below, driving the bottom 77 of the mold box upward; while the top follower 37 carries on its lower surface a top plunger 215, which enters the mold box from above and presses the material downward. The material thus becomes compressed between the bottom plate 77 and the top plunger 215. To prevent the discoloration of the bricks by the abrasion of the metal of the mold box an outer lining 216 is made to fit the inside of the mold box and is secured to a container 217; both the said lining and container are fitted to slide upon the top plunger 215. Rods 218 are secured to the container 217, and extending upward, passing through holes provided in the said top plunger and in the said top follower, are connected together at the top by a plate 220. Posts 221 are secured in the top follower, and are joined together at the top by a plate 223, and a compression spring 224 is placed between the plates 220 and 223 to hold the container 217 and the lining 216 downward by keeping the plate 220 yieldingly against the top of the follower 37. An arm 225 secured to the follower 37 carries a latch lever 226 which is pivoted at 227 on the top of said arm and is adapted to engage the plate 220, preventing its downward motion. The free end 228 of said latch lever is bent outward so as to travel in alinement with a latch operating pawl 229 pivoted at 230 to the post 231 rigidly mounted on the main frame. A tension spring 232 keeps the pawl 229 downward, while a spring 233 keeps the latch 226 inward toward the plate 220. The operation of the press is as follows:

Just after the mold box has been clamped inside the mold container ready for pressing, the crank pin 108 of the crank shaft 35 is at the dead center farthest from the toggle and in the opposite position to that shown in Fig. 2, the struts 38 and 39 being on a line bent to the extreme, and the bottom plunger 36 being at its lowest position, resting upon the stop 106; the top follower 37 is at its highest position holding the top plunger 215 high above the mold box, and the outer lining 216 surrounding said top plunger being held upward by the latch 226. The crank pin 108 turning in the direction shown by the arrow acts through the connecting rod 45 upon the struts 38 and 39 of the toggle causing them to straighten out and thus force the bottom plunger 36 and the sliding block 44 farther apart, moving the latter together with the rods 40, 41, 42 and 43, the follower 37 and the top plunger 215 downward, while the bottom plunger 36 remains resting upon the stop 106. At the beginning of this downward motion of the parts just enumerated the free end 228 of the latch lever 226 strikes the pawl 229 and is thrown upward causing the release of hold on the plate 220. The spring 224 immediately forces the plate 220 downward against the top of the follower, causing the outer lining 216 to slide down along the top plunger 215 and to project beyond its bottom when entering the mold box.

At the further motion of the follower the outer lining 216 engages first the brick material along the outer edge of the upper surface, and moving down until the bottom 234 of the container 217 comes in contact with the top of the mold box, brings said material down to the full depth required, before the pressure inside the mold box is considerably increased, as shown in Fig. 63.

Figure 3:
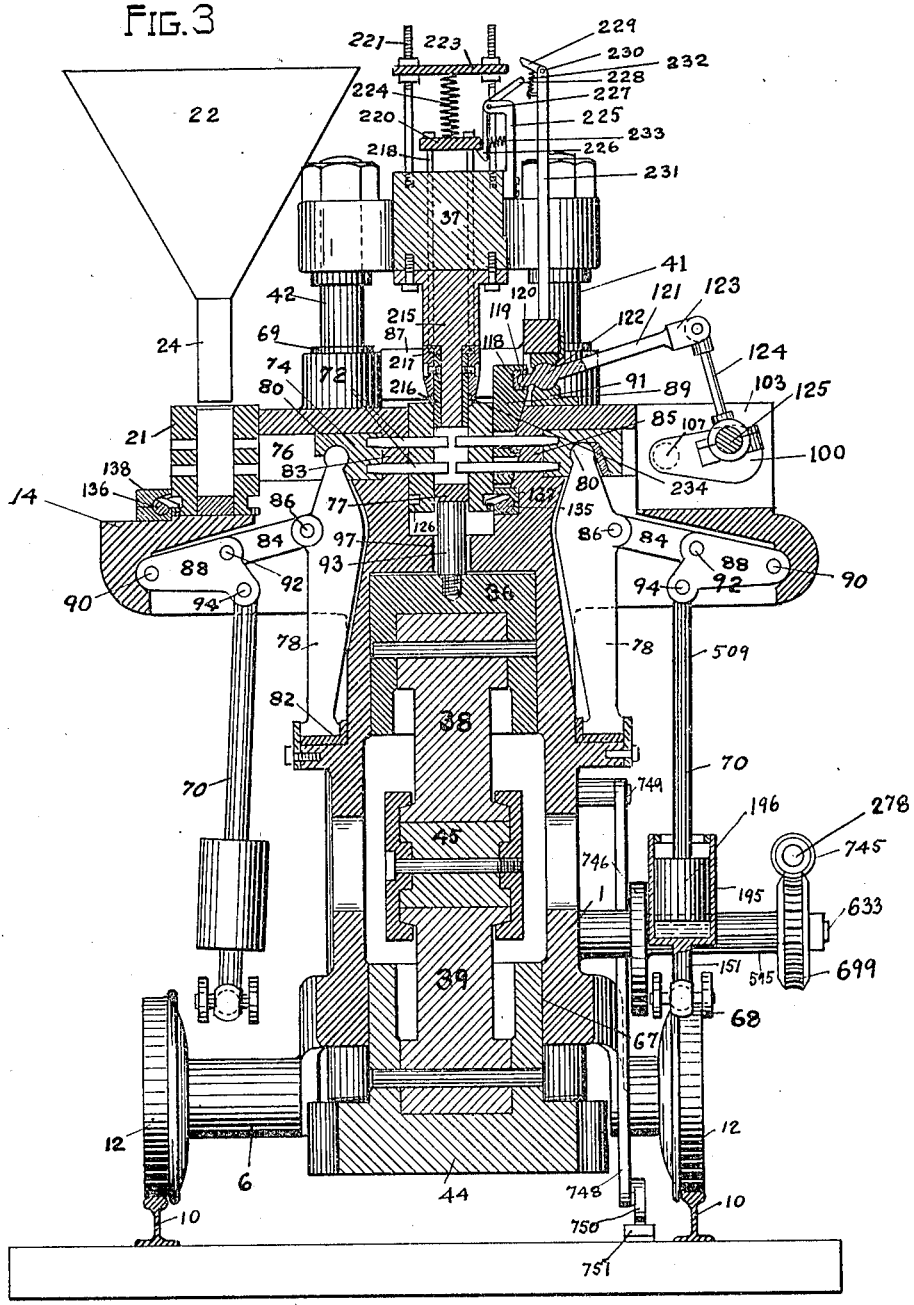
Fig. 3 is a cross section of the machine taken on line 3—3 of Fig. 2.

The brick material depressed by the outer lining 216 is moving along the walls of the mold box in an uncompressed state and does not become discolored by abrasion. The further motion of the follower 37 downward causes the top plunger 215 to move inside the outer lining 216, compressing the material and forcing it out of the interior of the lining into the mold box. The surface of the brick material sliding along the inner walls of the outer lining 216 becomes discolored by abrasion against said walls and moving edgewise enters the interior of the brick to a considerable depth, leaving no trace of discoloration upon the surface. When the pressure beneath the top plunger increases, the friction of the material against the outer lining 216 becomes high enough to stop any further advance of the top plunger downward, and the further extension of the bottom plunger 36 from the sliding block 44 by the toggle causes the said bottom plunger 36 to start moving upward, forcing the bottom plate 77 upward inside the mold box, and thus continue the pressing of the brick from top and bottom, until the two struts 38 and 39 of the toggle come to be in a straight line, when the brick will be compressed to the proper outside dimensions. The bottoms of the outer lining 216 and of the top plunger 215, will then be on a level, the spring 224 will be compressed, and the latch lever will engage the plate 220, thus locking the top plunger and the outer lining together. The connecting rod 45 operating the two struts 38 and 39 of the toggle is made of such a length as to carry the latter a short distance beyond the dead center (as shown in Fig. 2) for the purpose of increasing the duration of time the material inside the mold box remains under pressure. This is done for the purpose of permitting the introduction and withdrawal of the pressing pins 72 into and out of the mold box, in order to apply the final pressure to the material, by forming cavities of a greater or less depth in the sides of the brick before the pressure on the top and on the bottom of the brick is released. The mechanism operating to form the cavities in the brick is best shown in Figs. 3 and 16; it consists of a number of pins 72 secured in sliding blocks 74 fitted in the guides 76 on the main frame 1. Levers 78 are fitted at their upper ends in the bearings 80 in the above blocks while at their lower ends they are made to rest in the pockets 82 on the frame. Struts 84 are hinged to the levers 78 by the pins 86 and struts 88 are hinged to the main frame by the pins 90 and the two said struts 84 and 88 are joined together by the pins 92 forming the pin actuating toggles.

The driving mechanism operating the pin actuating toggles is best shown in Figs. 2, 3, and 7; it consists of a rocking shaft 61 mounted in the bearings 59 and 60 on the main frame. An arm 62 secured to said shaft carries at the free end a roller 63 adapted to bear against a surface cam 64 carried by the crank shaft 35. Two arms 66 secured at the ends of the rocking shaft connect at their forked ends 68 by means of the connecting rods 70 with the pins 94 carried by the struts 88 of the pin actuating toggles. The action of the cam 64 upon the roller 63 moving it away from the crank shaft 35 causes the arms 66 to rock upward and act through the connecting rods 70 upon the struts 88 of the toggles, straightening them out and causing the levers 78 to swing toward the center of the machine carrying the blocks 74 and the pins 72 forward, thus forcing the latter to pass through the holes provided in the sides of the mold boxes, enter the material to form the cavities, and to apply the final pressure on the brick.

The connecting rod 70 joining the arms 66 with the pins 94 of the pin operating toggles is formed with a hydraulic safety device which is intended to determine the final pressure upon the brick and which is shown in detail in Fig. 9.

The connecting rod 70 is formed of the lower stem 151 carrying at the top a hydraulic cylinder 195 bored to fit the piston 196 and containing a liquid. The piston is made hollow; it is provided with a cup leather in the usual manner and it fitted with a safety puppet valve 364, which is held down by a stiff spring 371 and which is adapted to be opened so as to discharge the liquid from below the piston, when the pressure inside the cylinder rises above a predetermined point. Another valve 389 is placed in the head of the piston to permit the return of the liquid into the cylinder when the pressure inside the latter is released.

The upper stem 509 of the connecting rod 70 is furnished at its lower end with a cap having a screw thread whereby it is secured to the top of the piston and at the top it carries an eye engaging the pin 94 of the pin operating toggle.

When the resistance to the motion of the pins 72 becomes too high the hydraulic pressure of the liquid inside the cylinder 195 becomes sufficient to raise the puppet valve 364. The piston then moves down inside the cylinder, thus shortening the length of the connecting rod 70, and terminating the further advance of the pins 72 inside the mold box.

The liquid from below the piston, after passing through the valve 364 enters the upper space inside the said piston, and remains there until at the downward stroke of the arms 66 the connecting rod becoming subject to a tensile strain will again extend when the liquid will return into the cylinder through the valve 389.

When the crank pin 108 is moving on its return stroke the struts 38 and 39 are being moved toward the crank shaft 35; the bottom plunger 36 is then moving downward and the top follower 37 is moving upward carrying the top plunger 215 with the outer lining 216 locked to it in the upward position by the latch lever 226, thus releasing the pressure from the entire upper surface of the brick at one time, and avoiding the possible damage to the newly made brick by the yielding outer lining. At the end of the upward travel of the follower 37 the end 228 of the latch lever 226 will easily pass the pawl 229 without releasing the hold on the plate 220 and at the end of the upward stroke the crank pin 108 and all the other mechanism will again be in the position at which they were at the start.

The means for moving the mold boxes along the rectangular track consists of mechanism for moving the said boxes longitudinally, and of mechanism for moving the same laterally across the machine. The former mechanism is arranged to engage four mold boxes and move them simultaneously, two of said boxes being moved from the stations 17 and 18 to the stations 18 and 19 and two other boxes from the stations 20 and 15 to the stations 15 and 16. The mechanism for moving the mold boxes laterally across the machine is arranged to engage two mold boxes and move them simultaneously, one of said boxes being moved from the station 16 to the station 17, and the other mold box from station 19 to station 20.

The means for moving the mold boxes longitudinally consists of the draw rods 135 and 136 having a circular cross section and fitted to rotate and to slide longitudinally inside the split guides 137 and 138 secured to the main frame. (Shown in detail in Figs. 10, 11 and 12.) Blocks 150 are mounted loosely on the draw rods 135 and 136 and are held in place by the collars 153 secured fast to said rods. Connecting rods 156 and 157 (best shown in Fig. 5) join said blocks 150 with the opposite ends 158 and 159 of a beam lever 160 which is fulcrumed at 161 to the main frame. The end 158 of said beam lever connects by the rod 162 with an arm 163, rigidly secured to a shaft 164 which is mounted in the bearings 165 and 166 on the main frame, as shown in Fig. 6. An arm 167 fixed on the end of the shaft 164 carries a roller 168 engaging the cam 169 carried by the crank shaft 35.

The action of the cam 169 upon the roller 168 causes the shaft 164 to rock in its bearings, and through the connection of the arm 163 and the connecting rod 162 swing the beam lever 160 around the fulcrum pin 161. The ends 158 and 159 of said beam lever moving in opposite directions will cause the draw rods 135 and 136 to move in opposite directions.

The mold boxes are provided with the grooves 126 running longitudinally in the sides 73 of the said boxes, and holes or depressions 129 are drilled in the said sides below the grooves. Gripping arms 131 are secured to the draw rods 135 and 136 and are provided at the ends with the pins or projections 130 adapted to engage the said depressions 129 in the sides of the mold boxes. By giving the draw rods 135 and 136 a slight turn in one direction the pins 130 in the gripping arms 131 are made to enter the holes or depressions 129 in the sides of the molds, so as to engage the latter and by giving a slight turn to the same rods in the opposite directions the pins 130 may be withdrawn from the depressions 129 disengaging the molds.

The ends of the draw rods 135 and 136 are made to pass through the turning sleeves 140, shown in detail in Figs. 14 and 15, held in the boxes 142, secured on the main frame of the machine; the sleeves are provided with feathers 143 engaging key ways 146 running for a considerable distance in the draw rods 135 and 136. The turning of the sleeves 140 in one or in the other direction will turn the draw rods 135 and 136 and thus operate the gripping arms 131 to engage or disengage the mold boxes.

Arms 148 are fixed to the sleeves 140 and are joined together by the connecting rod 149, as shown in detail in Fig. 18, in order to actuate simultaneously by the means to be hereinafter described, the draw rods 135 and 136, causing the gripping arms 131 carried by the draw rod 135 to engage the two mold boxes situated at the stations 17 and 18, and the gripping arms 131 carried by the rod 136 to engage the mold boxes situated at the stations 20 and 15.

For moving the mold boxes laterally across the machine there are provided two carriages, 171 and 176, (shown in Figs. 16 and 17) which are arranged to slide simultaneously forward and backward across the machine, the connection between said carriages being such as to cause one of them to move in one direction while the other is moving in the opposite direction. The carriages are provided with gripping mechanism which engage the mold boxes and carry them along, while moving in one direction, and disengage said mold boxes, thus leaving them behind while moving in the opposite direction.

The carriages are fitted to slide on the guide bars 177 secured to the main frame 1 underneath the table 14 and are joined by the connecting rods 197 and 198 at the arms 199 and 200, fixed on the upright shafts 201 and 202 working in the bearings 203, 204, 205 and 206 on the main frame, shown in Fig. 1. Two arms 207 and 208 also fixed on the same upright shafts, and joined together by the connecting bar 209 are coupled by means of the rod 210 with one end of the lever 211, which is pivoted at 212 to the frame of the machine and carries a roller 213 working in the grooved cam 214, which is keyed to the crank shaft 35. The action of the cam 214 through the medium of the roller 213, the lever 211, the connecting rod 210, the connecting bar 209 and the arms 207 and 208, causes the shafts 201 and 202 to turn simultaneously back and forth in the same direction, thus moving the arm 199 together with the connecting rod 197 and the carriage 171 in the opposite direction to the motion of the arm 200 together with the connecting rod 198 and the carriage 176.

The carriages are furnished with the bearings 219 fitted with the shafts 188 and 189 carrying at one end the operating arms 190 and 191 and at the other end the gripping arms 174 and 175, which are provided with the projecting pins 173 adapted to engage depressions or holes 170 drilled in the ends 75 of the mold boxes, as shown in Figs. 55, 56 and 57.

For the purpose of actuating the gripping arms, turning sleeves 178 carrying the toggle arms 186 and 187 are fitted in the bearings 179 on the carriages and connecting the links 192 and 193 join said toggle arms with the operating arms 190 and 191 carried by the shafts 188 and 189; the link 192 together with the arm 186 forms a toggle actuating the shaft 188, and the link 193 together with the arm 187 forms the toggle operating the shaft 189. By turning the sleeves 178 the toggles operating the said shafts may be made to force the operating arms 190 and 191 farther apart, thus bringing the gripping arms 174 and 175 closer together and causing the projecting pins 173 to enter the depressions 170 in the sides of the mold boxes, engaging them, or the said toggles may be made to pull the said operating arms closer together, thus moving the gripping arms apart disengaging the mold boxes.

Operating shafts 181 are made to pass through the sleeves 178 and are provided with key ways 182 engaging feathers carried by said sleeves. The shafts 181 are mounted in the bearings 183 and 184 located on the main frame in alinement with the path of travel of said sleeves, and they carry the arms 194 whereby they may be turned.

The means for turning the sleeves 140 in order to operate the draw rods 135 and 136, and for turning the arms 194 in order to operate the rods 181 are shown in Figs. 1, 2, 4, 5 and 6. It consists of a cam 522 secured on the crank shaft 35, engaging a roller 543 carried by a lever 544, which is pivoted at one end to the main frame of the machine and which operates to rock a short upright shaft 547, engaging by means of a link 548 an arm 551 carried by said shaft. Short arms 552 and 564 carried by the shaft 547 are connected by means of the rods 593 and 594 with the arms 148 carried by the sleeve 140 and with the arms 194 carried by the rods 181.

The cams 169, 214 and 522 actuating the mechanism for moving the mold boxes, being all secured to the crank shaft 35, which operates the press, will cause the several operations upon the mold boxes to be performed at regular intervals each time a brick is pressed, thus advancing the several boxes for a distance of one station each time a brick is made.

The following description will explain in detail the construction of the mechanism operating to remove the bricks from the mold box.

An opening 236, shown in Figs. 2, 16, 20, 21 and 22, is cut through the table 14 at station 19 and is fitted with a rectangular lower frame 237, having the inner dimensions slightly larger than the inside of the mold box. Another frame 238 provided with an opening 239 is secured to one of the bridges 87 (as shown in Fig. 22) at some distance above the table 14 and in alinement with the frame 237, and is fitted with a sliding frame 240 similar to the frame 237. The frame 237 has the upper edge beveled while the frame 240 is beveled at the bottom. When a mold box arrives at station 19 the said two frames 237 and 240 come in alinement on the opposite sides of the mold box. By drawing the two frames closer together the beveled edges entering the inside of the mold box cause the walls of the latter to spread apart, leaving the brick free, resting upon the bottom plate of the mold box.

For the purpose of actuating the frames 237 and 240 so as to move them one toward the other, two shafts 241 and 242 are fitted in the table 14 and are furnished with the short levers 245 and 246 fitted to engage the slots 249 and 250 in frame 237. By turning the said shafts simultaneously in the opposite directions the frame 237 may be made to move with a parallel motion in one direction and by reversing the direction of rotation of the shafts the frame is made to move in the opposite direction. The frame 240 is similarly operated by the shafts 243 and 244 fitted to turn in the frame 238. The said shafts also carry short levers 247 and 248 fitted to engage the slots 251 and 252 in the frame 240. To actuate the shafts 241, 242, 243 and 244 they are furnished with the arms 255, 257, 256 and 258, which are joined as shown in Fig. 19, by the link 259 coupling the arm 257 and 255 together and the link 260 coupling the arm 258 with the arm 256, while a pin 266 carried by an arm 254 secured to the shaft 244 is made to engage a slotted hole 267 in the arm 253 carried by the shaft 242. Motion is imparted to the system of arms by a cam 261 secured on the shaft 100 engaging a roller 262 carried on an arm 263 which is fulcrumed at 264, and which connects by means of a link 265 with a pin carried by the arm 254.

While one mold box is being clamped in the mold chamber at station 18 by the turning of the crank shaft 100 as described above, the mold box at the station 19 is being acted upon by mechanism receiving motion from the same shaft and is caused to become expanded so as to release the molded brick.

After the mold box has been opened by the frames 237 and 240 the brick together with the bottom plate of the mold box is elevated to a higher level, where the former is taken hold of by the proper mechanism which tilts it so as to rest upon the flat side, while the latter is again lowered and returned into the mold box before it starts on its travel toward the next station 20.

The brick removing mechanism (Figs. 20 and 21) consists of the removing plate 268 secured to the rods 269 and 270 and fitted in the inside 271 of the lower frame 237. The rods 269 and 270 are connected by a cross head 272 and are guided at their lower end in a bracket 273 carried by the bottom plate 397. The plate 268 is made to travel up and down by a cam 277 which is secured on a shaft 278.

The shaft 278 (Fig. 5) is mounted at one end in a bearing 752 carried by a bracket 144 and at the other end in a bearing 537 carried by an arm 538 which is secured to a column 539 running from the bottom plate 397 to the top plate 398, and receives its motion from the crank shaft 35 which carries a miter gear 65 engaging another miter gear 95 carried by the said shaft 278.

The cam 277 engages a roller 281 (Fig. 20) carried at one end of a lever 279 fulcrumed to the frame of the machine at 280; the other end of said lever connects by means of the connecting rod 284 with a pin 283 carried by the cross head 272. The cam 277 acting upon the roller 281 causes the lever 279 to swing around the fulcrum 280. The free end of said lever through the means of the connecting rod 284 causes the rods 269 and 270 together with the plate 268 to move at one time upward, thus elevating the brick together with the bottom plate 77 of the mold box and to move down at another time, thus lowering the bottom plate 77 after the brick had been removed.

For cleaning the mold boxes each time a brick is removed, scrapers 274 and 275 are pivoted to the rods 269 and 270 and are held apart by the spring 276. The motion of the rods upward causes the scrapers to bear against the sides of the mold box, thus loosening any of the brick material which might adhere to the inside of the mold.

The bricks are molded and pressed in an edgewise position and when they arrive at the higher elevation above the station 19, they are resting edgewise upon the removing plate 268. The further operation upon the bricks is the tilting them so as to rest upon their flat sides, thus bringing them to the position they are in when in the pile. For tilting the bricks there is provided gripping mechanism which takes hold on the brick from the two sides in order to support it while the removing plate 268 is lowered down and a tilting plate 312 is introduced in its place.

The gripping mechanism shown in Figs. 20, 21 and 22 consists of a swinging plate 285 formed integral with a hollow shaft 305 which is mounted in the bearings 306 and 307 on a frame 308, secured on top of frame 238, and of the yielding plate 286 carried by the clamping plate 287.

The bricks are gripped between the swinging plate 285 and the yielding plate 286.

The swinging plate 285 is operated by a grooved cam 295 on the shaft 278 engaging the roller 296 carried at one end of a lever 297 fulcrumed to the frame at 298 and connected at the other end by the rod 299 to an arm 300 secured to a shaft 301 working in a bearing 302 on the frame of the machine. Another arm 303, secured to the shaft 301 at the other side of the bearing 302, engages by means of a connecting rod 294 the crank 304 carried by the shaft 305. The throw of the cam 295 is such as to actuate the crank 304 by means of the aforesaid connection giving it a quarter turn first in one direction and then in the other, thus swinging the plate from a vertical to a horizontal position and then back from a horizontal to a vertical position.

The yielding plate 286 is secured to the clamping plate 287 by means of the pins 134 and the springs 288, while the said clamping plate is slidably mounted on the bracket 282, by means of the guiding pins 154 carried by said clamping plate and fitted to pass through the holes 155 drilled in the bracket 282. The clamping plate is held yieldingly by a tension spring 309 fastened at one end to the bracket 282 and at the other end to one end of the lever 290 fulcrumed at 292 to the bracket and connected at the other end by a pin 291 to the stem 289 carried by the clamping plate. The clamping plate is actuated by a tappet 293 carried by the connecting rod 294 coming in contact with the end of the lever 290, thus forcing it back against the action of the spring 309.

The grooved cam 295 operating both the swinging plate 285 and the clamping plate 287 is so formed and is so timed in relation to cam 277 actuating the brick removing mechanism as to keep the swinging plate 285 a few degrees from the vertical position, and the tappet 293 on the connecting rod 294 in contact with the end of the lever 290, at the time the removing plate 268 actuated by the cam 277 has reached the highest point. The further motion of the connecting rod 294 will swing the plate 285 to the vertical position bringing it in contact with the brick on one side and the tappet acting on the end of the lever 290 will cause the clamping plate 287, together with the yielding plate 286, to move toward the brick from the other side, thus gripping it tightly, and holding it for some time until the removing plate 268 has been lowered and the tilting plate 311 has been swung upward to support the brick.

Inside the hollow shaft 305 is placed the shaft 310 carrying the tilting plate 311 which is provided with a yielding plate 312 secured to it by means of the pins 503 and the springs 313. The shafts 305 and 310 are adapted to turn independently one from the other; and for this reason the lower portion of the outer hollow shaft 305 is cut away to permit the motion of the tilting plate 311.

The inner shaft 310 carries a pinion 314 gearing with a sliding rack 315, shown in Fig. 19, which receives motion from a cam 316 fixed on the shaft 278. The cam acts upon a roller 317 carried at one end of a lever 318 fulcrumed to the frame of the machine at 319 and joining at the other end by means of a connecting rod 322 to an arm 320 carried by a shaft 321. Another arm 323 secured to the shaft 321, engages by means of a connecting rod 325 the sliding rack 315 which operates the said shaft 310 by means of the pinion 314.

The stroke of the cam 316 is such as to cause the tilting plate 311 to swing for a half turn, and the timing of said cam is such as to keep said tilting plate in a vertical position downward when the emptying plate 268 is being moved upward and to start swinging said tilting plate toward the brick at the time when the said removing plate has been lowered far enough down to clear the swipe of the tilting plate.

When the tilting plate reaches the brick the cam 295 begins to act (through the connections) upon the connecting rod 294 moving it so as to cause the tappet 293 to recede from the end of the lever 290, thus causing the gripping mechanism to release the brick; the further motion of the connecting rod will cause the plate 285 to swing together with the tilting plate until the former has turned for an angle of 90° when the brick will be in a horizontal position resting upon the swinging plate 285.

In the succeeding operation the bricks are removed from the plate 285 and are raised or lowered so as to be on the elevation they will occupy when placed in the pile. For this purpose there is provided an elevator 393 furnished with a number of moving shelves 408 carried by an endless link belt and adapted to be driven with an intermittent motion in one or in the other direction. The bricks are removed one at a time from the swinging plate 285 and are carried horizontally and placed on the shelf of the elevator which comes on the same level. The elevator raises the bricks when the layer in the pile is at the same or above the elevation of the swinging plate 285 and lowers them when said layer is below said plate. There is provided in connection with the elevator piling mechanism, which may be adjusted to work at the required elevation, and which may be made to remove the bricks from the shelves 408 of the elevator at any desired elevation in accordance with the height of the layer piled above the level of the ground.

The elevator shown in Fig. 28 is made up of a frame consisting of the four channel bars 394 connected together at the bottom by the angle pieces 395 secured to the bottom plate 397 of the machine and at the top by the angle pieces 396 secured to the top plate 398. A shaft 401 carrying the sprocket wheels 402 is mounted in the bearings 399 fitted between the channel bars 394 at the bottom and a shaft 403 carrying the sprocket wheels 404 is mounted in the bearings 400 fitted between the channel bars 394 at the top. A sprocket chain comprising the outer links 405 and the inner links 406 is made to travel over the sprocket wheels 402 and 404 forming an endless belt. The links are furnished with the shelves 408 and are provided with the guiding rollers 407 working in the grooves of the channel bars 394.

Before describing the operation of the elevator I will enumerate the several shafts employed to impart motion to the several parts constituting this machine.

There are provided a number of driving shafts which are geared together by miter gears so as to cause them all to run with the same speed. The driving shafts are connected by miter gears to the main crank shaft 35 of the machine, thus gearing them to make one revolution each time a brick is pressed. The several devices forming part of this machine are connected to one or the other of these driving shafts to receive motion.

The main crank shaft 35 drives the shaft 278 by means of the miter gears 65 and 95, as stated above, while the vertical shaft 542 is driven by the shaft 278 through the medium of the miter gears 540 and 541. A miter gear 545 (Fig. 4) carried at the top of the vertical shaft 542 engages the miter gears 546 and 549 secured to the shafts 374 and 550, imparting motion to them. The shaft 550 is geared by a pair of miter gears 553 and 554 with the shaft 555, which rotates at one end in a sleeve 556 (Fig. 37) and at the other end in a bearing 557, and which in turn carries a spur gear 558 engaging another spur gear 559 having the same number of teeth, and carried by the shaft 465. The shafts 35, 278, 542, 374, 550 and 465 are thus all running at the same rate of speed making one revolution each time a brick is pressed.

For driving the elevator 393 a ratchet wheel 409, shown in Figs. 28 and 34, is secured to the upper shaft 403 and is provided with a number of pawls, actuated by cams and springs; the said pawls and springs may be so arranged as to drive the ratchet wheel 409 in one direction causing the loaded shelves of the elevator to travel upward or to release the said ratchet wheel, permitting it to turn in the other direction, causing the loaded shelves to come down by gravity. The following description will explain at length the arrangement of the devices for actuating the elevator.

An operating pawl 410 is pivoted to the free end 411 of a swinging lever 412 fulcrumed at 413 and carrying a roller 414 working against a surface cam 415 which is mounted on the driving shaft 374 and is held by a clutch 416. The clutch is slidably fitted on the shaft, by a feather engaging a key way in the shaft. The teeth of the clutch are spaced 180° apart so as to permit the engagement of the cam by the clutch at the two opposite positions. A spring 417 keeps the pawl 410 against the ratchet, and a spring 418 keeps the roller 414 in bearing against the cam 415 while the pawl 419, pivoted at 420 and held by a spring 421 against the ratchet wheel 409 prevents any back motion.

A draw bar 422 is pivoted to the end 423 of a swinging lever 424 which is fulcrumed at 425 and carries a roller 426, working against a surface cam 427 keyed to the driving shaft 374. A spring 428 keeps the roller 426 against the cam 427. A notch 429 on the draw bar 422 is made to engage the extreme rounded end 430 of a bell crank lever 431 fulcrumed at 432 to a bracket 432ª carried by the frame, while a pin 434 is secured in the other arm 433 of the bell crank to engage in its downward motion the pawl 410. The end of the draw bar 422 carries a hook 435 adapted to engage a pin 436 carried by the pawl 419, and a suspending pin 437 is fastened to the frame in order to suspend the draw bar 422 when thrown out of use.

When the machine is operating upon the upper layers of the pile, which are at the same elevation as the swinging plate 285 or above the said elevation, the driving mechanism is arranged to move the elevator shelves 408 upward, by having the draw bar 422 suspended from the pin 437, (so as to throw the roller 426 carried by the swinging arm 424 out of contact with the cam 427, and to throw the pawl 419 in gear with the ratchet wheel 409) and the cam 415 set on the shaft 374 in the opposite position to that shown in Fig. 28. The draw rod 422 will then remain inactive, while the cam 415, acting upon the roller 414, will cause the lever 412 and the pawl 410 to swing forward and backward, thus actuating the ratchet wheel 409, moving it in the direction of the arrow, while the pawl 419 will engage the teeth of the ratchet wheel preventing any back motion.

When the machine is operating upon the lower layers of the pile, the mechanism is arranged to move the elevator shelves downward. In this case the cam 415 is turned for an angle of 180° on the shaft, so as to bring it in the position shown in Fig. 28, the draw bar 422 is lowered from the pin 437 and is placed upon the bell crank lever 431, the notch 429 of the said bar engaging the rounded end 430 of the lever and the hook 435 engaging the pin 436 of the pawl 419. Under this arrangement the pawl 419 will be drawn out of engagement with the teeth of the ratchet wheel at the time the pawl 410 commences to move on its backward stroke, and the load on the elevator shelves will cause the tooth of the ratchet wheel to follow the backward motion of the pawl 410, thus permitting the elevator shelves to come down by gravity while the cam 427 acting upon the swinging arm 424 will cause the draw bar 422 to move toward the ratchet wheel, thus causing the bell crank lever 431 to swing to the right permitting the pawl 419 to follow the outlines of the ratchet, until near the end of the stroke of the pawl 410 the pin 434, carried on the arm 433 of the bell crank lever, will strike the end of the said pawl 410 throwing it out of engagement with the tooth of the ratchet wheel, thus permitting the said tooth to move slightly beyond the end of the pawl 410 when the said ratchet wheel will come to a stop by striking the end of the pawl 419. At the commencement of the forward stroke of the pawl 410, the end of said pawl will be held out of engagement by the pin 434 and the ratchet wheel will remain at rest for the entire stroke, being held by the pawl 419. The ratchet wheel 409 may be thus driven in one or the other direction, moving intermittingly one tooth each time the driving shaft 374 has made one revolution. The number of teeth on the ratchet wheel 409 is made to be the same as those of the sprocket wheels 404, thus causing an advance of one link of the elevator belt each time the shaft 374 has made one revolution or causing the advance of one shelf of the elevator each time a brick is pressed.

The ratchet wheel 409 and the sprocket wheels 404 are secured upon the shaft 403 of the elevator at such an angle one from the other as to bring one of the shelves 408 at the level of the swinging plate 285 when the elevator is at rest.

There is provided a sliding carriage 338 (Figs. 23, 24, and 25) furnished with gripping bars 343 adapted to engage the bricks resting upon the swinging plate 285, lift them slightly above the said plate, and transfer them to one of the shelves 408 of the elevator, which is at rest on the same level as the said swinging plate 285.

The carriage 338 is provided with the gibs 339 fitted to the horizontal gib slide 340 carried by the guiding bar 335. The guiding bar is mounted upon the vertical gib slides 337 carried by the stationary frame 327. This frame is rigidly secured to the frame 238 (Fig. 26) and carries a shaft 328 which is provided with the arms 330 and is mounted in the bearings 329. Links 331 connect the said arms with the guiding bar 335. By turning the shaft 328 in one or in the other direction the guiding bar 335 together with the carriage 338 may be raised or lowered. The turning of said shaft is done by a cam 383 which is secured to the shaft 374 and which engages a roller 382 carried by a lever 380. The lever 380 is fulcrumed at 381 and is thus caused to swing forward and backward imparting a swinging motion to a bell crank lever 376 which is joined to it by the rod 379. The bell crank lever is connected by the rod 377 to the arm 375 secured to the shaft 328 and causes the latter to turn in one or in the other direction, thus raising or lowering the guiding bar 335 together with the carriage 338.

For the horizontal movement of the carriage 338 along the horizontal gib slide 340, a cam 333 (Fig. 1) is secured to the driving shaft 278 and engages a roller 324 carried by an arm 392 which is pivoted to the frame at 172 and which is caused to oscillate by the action of the cam. The arm 392 is joined by means of a connecting rod 391 to an arm 390 fastened to a horizontal shaft 387, which is mounted in the bearings 388 (Fig. 1) and 389$^a$ (Fig. 2) provided on the underside of the top plate 398 and which receives an oscillating rotary motion from the said arm 392. Another arm 386 is secured to the horizontal shaft 387 and is connected by a link 385 to a pin 384 carried by the carriage. The oscillating motion of the shaft 387 is thus transmitted to the carriage 338 by means of the arm 386, the connecting link 385 and the pin 384, causing the carriage to travel from the swinging plate 285 where it takes hold of the brick to the shelf 408 of the elevator where it deposes the same.

The carriage 338 is formed of the vertical plate 326 and the horizontal plate 341; the former is furnished with the gibs 339 fitted to slide on the horizontal gib slide 340, while the latter is provided with the slots 342 in which are fitted to slide the gripping bars 343. The gripping bars are bent downward at the end 180 in order to receive the yielding plates 344, which are secured to them by the pins 99 and the springs 345.

A shaft 346 is fitted in a bearing 358 carried by the guide bar 335 and is provided with a long key way 185. The shaft 346 is made to pass through the hubs 347 of the actuating levers 348, which are placed in the pockets 222 provided in the horizontal plate 341. The levers are fitted to slide freely along the shaft 346, but they are prevented from turning by the feathers 235. The upper ends 349 of said levers are made to engage the slots 350 in the gripping bars, while the lower ends of the levers are made to engage the pins 351 carried by the bent arms 352 which are pivoted at 353 to the vertical plate 326 of the carriage and which carry at their free bent ends 354 a gripping plate 355, which is furnished with a yielding plate 356 held from the said gripping plate by the springs 357 and the pins 336. The turning of the shaft 346 in one direction will bring the yielding plates 344 and 356 closer together, thus gripping the brick while the turning of the said shaft in the other direction will carry the said yielding plates farther apart, thus releasing the hold on the brick.

The shaft 346 carries an operating lever 359 which connects by the rod 360 (Fig. 26) with the arm 361 carried by the shaft 362. This shaft is mounted in the bearings 363 and carries an arm 365 which joins by means of the connecting rod 366 to a bell crank lever 367, which is pivoted to a bracket 368 secured to the top plate 398. A connecting rod 369 joins the bell crank 367 with a swinging lever 370 which is pivoted at 381 and which carries at the free end a roller 372, engaging a cam 373 mounted on the shaft 374.

The lever 370 being actuated by the cam 373 is swinging forward and backward and in turn swings the arm 359 together with the shaft 346 by the means of the connecting rod 369, the bell crank lever 367, the connecting link 366, the arm 365, the shaft 362, the arm 361 and the link 360, thus clamping the grip on the brick or releasing the hold on the same.

The operation of the mechanism for transferring the bricks from the swinging plate 285 to the elevator shelves 408 is as follows:

After the swinging plate 285 has come to a horizontal position, the carriage 338 is moved toward the press by the action of the cam 333, and at the end of the stroke the yielding plates 344 and 356 come one on each side of and opposite the brick which is resting upon the swinging plate 385. The cam 373 causes then the gripping plates to close, thus engaging the brick from the two sides. The cam 383 then begins to act and causes the guiding bar 335 together with the carriage 338 and the brick to raise slightly upward, thus bringing the brick out of contact with the swinging plate 285.

The carriage then starts on its return stroke toward the elevator and at the end of said stroke the brick is brought to be over the shelf 408 of the elevator, when the guiding bar 335 together with the carriage is lowered down, the yielding plates 344 and 356 opened out, and the carriage again moved toward the press. The elevator is then caused to advance in an upward or downward direction for a distance of one link, thus bringing the next shelf to the level of the swinging plate 285. The bricks are thus brought from the elevation of the swinging plate 285 to a higher or lower elevation according to the level of the layer in which they are going to be placed.

The bricks are removed from the elevator by a swinging transporting arm 487 (Figs. 29, 30, 31, 32 and 33) and are placed one at a time upon a traveling distributing belt 607, carried by a distributing arm. The belt is made to move intermittingly, advancing each time a brick is disposed upon it until a whole row is thus formed, when a piling arm engages the entire row of bricks and deposes it upon the pile. While a new row of bricks is being distributed upon the belt, the machine is made to advance along the track for a distance equal to the spacing of the rows in the pile (Fig. 61) and another row is then similarly deposited upon the pile, and this operation is repeated until an entire layer is formed.

The machine is then carried back along the track and the piling mechanism is then adjusted for depositing the bricks at a higher elevation upon the pile.

The following is a description of the mechanism operating to remove the bricks from the elevator to the distributing belt and from the latter to the pile. At the front of the machine there is secured to the main frame 1 a bottom plate 397 which is placed a short distance above the ground and upon which the elevator frame 394, the frame for the transporting arm and the frame for the distributing and piling arm are erected. Another plate 398 is fixed high above at a greater or less elevation according to the extreme height of piling the machine is intended. The top plate 398 is supported from the bottom plate 397 by the column 539, by the guiding rods 438 and by the channels 394 which constitute the elevator frame.

A sliding frame 439 is provided with the bosses 440 (Figs. 29 and 30) fitted to slide upon the guiding rods 438 and is supported from a supporting block 445 (Figs. 35 and 36) by means of a suspending screw 441. The sliding frame 439 carries the transporting arm 487 which is formed integral with the sleeve 488 fitted in the bearing 489 in the said frame and held secure in the said bearing by the collar 490.

The sleeve 488 is bored to fit a swinging shaft 469 which is mounted in a bearing 470 on the top plate 398 and in a bearing 471 (shown in Fig. 6) in the bottom plate 397. A feather in the sleeve 488 engages a long key way cut in the shaft 469, thus connecting the transporting arm to the said shaft so as to swing together allowing at the same time the said swinging arm to slide up and down along the shaft.

The swinging shaft 469 receives its motion from the cam 478 (Figs. 35 and 36) secured to the shaft 465 engaging a roller 476 carried by the arm 474 which is fulcrumed at 475; the free end of the said arm joins by means of the link 473 with the arm 472 carried by the shaft 469. A spring 479 keeps the roller 476 against the cam 478. The transporting arm 487 carries gripping mechanism which is adapted to engage a brick and sustain it while being transported from one of the elevator shelves 408 to a distributing belt 607.

The gripping mechanism consists of the gripping arms 504 and 505 (Figs. 30, 31, 32 and 33) which are pivoted to the forked ends 501 of a cross plate 495 and which carry the arms 514 and 515 whereby they may be operated. The cross plate 495 carries the upper lug 496 formed with an extending arm 499 carrying the pin 500, and a lower lug 497 provided with a boss 498. Holes 491 are drilled in the upper and lower lugs and are fitted with the pivoting tubes 502 which are driven in tight in the holes 491 in the lugs, and projecting beyond the latter, enter the bearings 493 provided in the two branches 492 at the forked end of the transporting arm 487.

The arms 504 and 505 are operated by a toggle formed by the links 512 and 513 which connect at one end to the arms 514 and 515 and at the other end to a block 511 secured to a rod 494 which is slidably working inside the pivoting tubes 502. By moving the rod 494 upward the toggle causes the gripping arms 504 and 505 to open, and by moving it downward it causes them to close and thus engage the bricks.

The rod 494 is connected to an arm 523 carried by a shaft 524 held in a bearing 525 on the transporting arm 487. Another arm 526 is secured to the shaft 524 and carries at the free end a roller 527 engaging a groove 529 in a loose collar 528 sliding on the shaft 469. The collar 528 carries a flange 530 fitted to engage a groove 531 in a cam collar 532 which is slidably fitted on a clamping shaft 480 and which is provided with a feather 533 engaging a key way in the said shaft. The collar 532 has a groove cut at the outside forming a cam, which engages a roller 534 working on a stationary pin 535 held in a lug 536 secured to the boss 440. The clamping shaft 480 is held in the bearing 481 in the top plate 398 and in the bearing 482 (shown in Fig. 6) in the bottom plate 397. It carries a lever 483 (Figs. 35 and 36) at the top, which lever is provided with a roller 484 engaging a cam 485 secured to the shaft 465; a spring 486 keeps the roller 484 against the cam 485. The cam 485 which is turning together with the shaft 465, making one revolution each time a brick is pressed, operates the shaft 480 by means of the roller 484 and the lever 483, causing the said shaft to turn first in one direction and then in the other, thus causing the cam collar 532 to turn similarly. The roller 534 revolving on the stationary pin 535 engaging the inclined groove of the said cam collar causes the latter to slide up or down upon the shaft 480, moving along the loose collar 528 by means of the groove 531 engaging the flange 530. The motion of the collar 528 up and down operates the clamping toggle by means of the groove 529, the collar 527, the arm 526, the shaft 524, the arm 523 and the rod 494, thus actuating the gripping arms 504 and 505 causing them to close and engage the brick when said rod is raised up or to open and release the brick when the same rod is lowered down.

The gripping arms 504 and 505 carry the yielding and equalizing plates 506 and 507 pivoted to them in the slotted holes 508 and held yieldingly by the springs 510.

The mode of action of the several devices which by their agency operate to transport the bricks from the elevator to the distributing belt 607 is as follows:

The transporting arm 487 is caused to swing toward the elevator by the actuating mechanism described above. The gripping arms 504 and 505 carried by the transporting arm 487 are kept open by the cam 485 carried on shaft 465 and by the connections above described. At the end of the motion of the transporting arm the gripping arms 504 and 505 are on the opposite sides of the brick. The cam 485 then actuates the said gripping arms causing them to close upon the brick, thus engaging it. The suspending shaft 441 together with the sliding frame 439, the transporting arm 487 and the brick are raised upward by means of the mechanism which will be hereinafter described, thus clearing the brick from the supporting elevator shelf. The transporting arm 487 is then swung toward the distributing belt, and is brought to a stop when the brick is at the middle of said belt; then the supporting shaft 441 is lowered until the brick comes to rest upon the belt, when the gripping arms are opened releasing the hold on the brick. The distributing belt 607 is then caused to advance, thus moving the brick out of the way, and the transporting arm is again raised upward and is started on its return swing toward the elevator.

The transporting arm 487 carries a bell crank lever 517 fulcrumed on a pin 516, one of the arms 518 of said lever connects by the link 519 to the pin 500, carried by the extending arm 499 of the cross plate 495 of the gripping mechanism. The other end of said bell crank carries a roller 520, engaging a cam track 521 secured to the sliding frame 439. The cam track actuates the bell crank 517, causing it to swing upon the transporting arm 487, and acting through the link 519 upon the pin 500 causes the gripping mechanism to swing upon the said transporting arm around the pivoting tubes 502. The cam track 521 is so formed as to keep the direction of the gripping plates 504 and 505 parallel to the sides of the brick at the time the said plates are being moved over the elevator shelf 408 to engage the brick, and to keep the said plates in the direction of the belt 607 at the time the brick is placed thereon.

The elevator shelves are spaced farther apart than the thickness of the layers of brick in the pile, and for this reason in adjusting the levels of the distributing arm and of the transporting arm 487 in order to accommodate the piling mechanism to the elevations of the several layers of brick in the pile, there is a variation in the difference of levels between the shelf whence the bricks are removed and the distributing belt 607 upon which they are placed; this variation amounts to more than the distance between two adjacent shelves in case the stack is at the same height as the swinging plate 285.

To take care of this difference in level there is provided mechanism which gives an up and down motion to a greater or less extent to the transporting arm 487, while the latter is swinging in one direction from the elevator toward the distributing belt and while it is swinging in the opposite direction from said belt back toward said elevator.

For this purpose a bridge 442 (Figs. 35 and 36) is secured to the top plate 398, and upon said bridge is mounted a bracket 443 which is provided with a pocket 444 to receive and guide the supporting block 445. A supporting screw 441 carrying a collar 446 passes through a bore in said supporting block and is suspended from it by means of the said collar. The supporting screw passes through an opening in the top plate 398 and extending downward passes through a tapped hole 448 in the sliding frame 439 and terminates near the bottom plate 397. A hand crank 447 is provided at the top of the supporting screw for the purpose of turning it, when the raising or lowering of the sliding frame 439 is required, in order to bring it to the proper level for the successful removal of the bricks from any one of the elevator shelves. A set screw 449 is provided in the frame 439 to make the supporting screw fast in the frame after the latter has been brought to the required level.

The supporting block 445 is made to move up and down by a lever 452 which is connected at one end by a link 451 to a pin 450 carried by said block, and is slotted at the other end to receive a sliding block 460 which is bored to fit a pivoting pin 453 held in an adjusting block 454. The said adjusting block 454 rests upon a frame 455 secured to the top plate 398 and is held down by a bolt 456, which passes through a hole in said block and through a slot in the said frame. An adjusting screw 457 held in a bearing 458 and provided with a hand wheel 459 is made to engage a threaded hole in the adjusting block, and is used for shifting the pivoting pin 453. A pin 462 carried by a block 463 fitted to slide in guides on the frame 455 is made to pass through a pivoting hole 152 in the lever 452 and carries at the end a roller 461 engaging a cam 464 cast integral with the gear 559 and mounted on the shaft 465 which is working in the bearing 466 carried by a bracket 467 and in a bearing 468 provided in the top plate 398. The said cam 464 actuates the roller 461 moving it up and down and causes the lever 452 to swing and thus raise and lower the supporting block 445 together with the supporting screw 441 the sliding frame 439 and the transporting arm 487. The amount of travel of the supporting block may be regulated by adjusting the pivoting pin 453. By bringing the said pivoting pin 453 closer to the pin 462 the travel of the supporting block is increased and by moving it farther away the said travel is decreased.

In building up the layers of the pile which are at a lower elevation than the swinging plate 285 the elevator shelves are made to move downward and the bricks are removed by the transporting arm 487 from the shelf next above the elevation of the layer, and are carried to the level of the distributing belt 607 of the distributing arm by the up and down motion of said transporting arm 487.

In building up the layers of the pile which are at a higher elevation or at the same elevation as the swinging plate 285 the elevator shelves are made to travel upward and the bricks as before are removed by the transporting arm 487 from the shelf next above the elevation of the layer, and are brought down to the level of the distributing belt of the distributing arm by the up and down motion of said transporting arm, the range of said up and down motion may be readily adjusted by the adjusting block 454.

The distributing arm is mounted on the upright frame 334. This frame consists of the upright channels 590, which are secured at the bottom to a base plate 589 and at the top to the frame plate 569. A plate 568 is secured to the frame plate 569 by the stud bolt spreaders 570, forming a frame for gearing. The plate 568 is provided with a sleeve 567, which is fitted to work in the bearing 566 inside the boss 565 carried by the top plate 398.

The base plate 589 is pivoted to the bottom plate 397 by means of the pin 588 which is secured to the said bottom plate at a point in alinement with the bearing 566. The upright frame may be turned around the pin 588 at the bottom and inside the bearing 566 at the top. A locking pin 591 slidably fitted in a hole in the base plate 589 is made to engage either of the two holes 592, drilled in the bottom plate 397, to register with the said locking pin 591 when the said base plate 589 is placed in one direction or in the opposite direction across the machine.

The upright frame 334 supports the distributing arm 596 and carries the driving shaft 586 connecting the operating mechanism of the said distributing arm with the driving shafts on the top plate 398 of the machine.

The gearing for raising and lowering the distributing arm 596, so as to adjust it to the level of the layer the bricks are to be piled in, consists of the shaft 562 which is made square at the end to fit a wrench and which is mounted in a bearing on a bracket 563 (Fig. 1) carried by the top plate 398 and which is fitted with a bevel pinion 561 engaging a bevel gear 560 keyed to a sleeve 556 (Fig. 37). The interior bore of the sleeve 556 is made to fit the shaft 555 while the outside is finished to fit the inner bore of a sleeve 567 carried by the plate 568. The outside of the sleeve 567 is fitted to work in the bearing 566.

A spur gear 571 carried by the sleeve 556 engages a pinion 572 working on a pin 573 secured on the plate 568. The pinion 572 engages the teeth of the internal gear 574 fitted to turn around a boss 477 carried on plate 569. The internal gear is formed integral with the outer gear 575 which engages the four spur pinions 576 carried by the screw shafts 577 and operates them simultaneously, in order to raise or lower the distributing and piling arm.

The shaft 555 working inside the sleeve 556 extends downward and passing through the bearing 557 in the plate 569 receives the pinion 578 which engages and drives a train of gears 579, 581, 583 and 585 which are mounted on the pins 580, 582 and 584 and on the shaft 586 which is fitted to work in the bearings 587 and which connects to operate the driving mechanism of the distributing and piling arm.

The distributing arm 596 (Figs. 40, 41, 42, 43 and 44) consists of a long frame composed of the lower horizontal bars 597 and the upper bars 598 which are secured together at one end by the side plates 599 and by the bars 600 at the other end. The bars 600 are fitted to slide up and down inside the upright channels 590.

The bars 600 are hollow and are furnished at the top with screw threads adapted to engage the threads of the screw shafts 577 from which they are suspended. Spreaders 601 are provided to keep the two sides of the frame apart.

Pins 602 carrying rollers 603 are placed between the two sides of the frame and are secured to the bars 600. Bearings 604 provided in the side plates 599 are fitted with the driving shaft 605 which carries a pulley 606. A distributing belt 607 is made to pass over the rollers 603, the pulley 606 and a number of supporting rollers 608 which are mounted on shafts 609 held between the bars 597 of the frame.

A noiseless ratchet (shown in detail in Fig. 45) is fastened to the shaft 605 for the purpose of turning it intermittingly. The ratchet consists of the disk 610 which is made fast to the shaft 605. It is provided with a number of pockets 611 which carry the rollers 612. A strap 614 having a circular bore surrounds the disk and rollers and is held in place by the plates 615. Springs 613 are arranged to force the rollers 612 outward against the circular bore of the strap. An arm 616 carried by the strap is used to operate the noiseless ratchet.

The arm 616 is connected by means of a bar 617 with the lever 618 carried by the shaft 619. This shaft is mounted in the bearings 620 carried by a frame 621, which is fastened to the bars 597 and 598. The lever 618 is slotted at the end 622 to receive an adjusting sliding block 378, which carries the pin 332 engaging the end of the bar 617. By setting the block 378 farther out or closer in the lever 618 may be lengthened or shortened, and thus the stroke of the bar 617 and of the arm 616 on the strap of the noiseless ratchet may be increased or diminished. At the other end of the shaft 619 is secured the lever 623 which carries at the free end a roller 624 fitted to work in a grooved cam 625 secured to a shaft 626 which is mounted in the bearings 627 and 628 on the frame 621. The shaft 626 carries the miter gear 629 engaging a similar miter gear 630 carried by the bushing 631, which bushing is fitted in the bearing 632 on the lower bar 597. The bushing 631 is driven by a feather engaging a key way in the driving shaft 586, which is geared to make one revolution each time a brick is pressed, and which causes the distributing belt 607 to advance each time a brick is placed on it by the transporting arm 487. When a row of bricks has been distributed upon the belt 607 it is gripped by a number of piling grippers carried by a piling arm and are placed upon the pile.

The piling arm (shown in detail in Figs. 46, 47, 48, 49, 50 and 51) consists of a frame formed of the side bars 706 which are secured together by the cam track bodies 704 and 705. This piling frame is mounted upon the distributing arm by means of the two bell cranks 708 and 709, which are fulcrumed to the upper bar 598 of the said distributing arm by the shafts 710. The bell cranks 708 and 709 carry at one end the pins 707 which are made to pass through holes in the side bars 706, and at the other end they carry the pins 711 which engage holes in the connecting bar 712 whereby the said bell cranks are connected in order to be operated simultaneously. The means for raising and lowering the piling arm consists of the cam 721 secured to a shaft 636, which shaft is geared down to make one revolution each time a row of bricks is distributed upon the belt, and engages a roller 720 carried at the free end of a lever 715 which is fulcrumed on a shaft 716 mounted in the bearings 717 and 718 on the top bars 598. A pin 714 carried by the lever 715 connects by means of a link 713 with a pin 719 carried by the bell crank 708. The cam 721 causes the lever 715 to swing forward and backward and this lever in turn operates the two bell cranks 708 and 709 by means of the link 713 swinging them likewise and causing them to raise the piling frame so as to lift the bricks from the distributing belt at one time and to lower the piling arm at another time when the bricks are being placed upon the pile.

A spring 722 secured to the lever 709 at one end and to a pin on the top bar 598 at the other helps to counterbalance the weight of the piling arm.

A gripper frame 651 is placed inside the piling frame. It carries at the ends the lugs 700 which are furnished with the guide wheels 701 working on the pins 702 and fitted to travel in the grooved tracks 703 cut in the track bodies 704 and 705. The motion is imparted to the gripper frame 651 by a grooved cam 644 cut in the gear body 635 engaging a roller 642 working on a pin 643 carried on a swinging lever 640 which is fulcrumed on the frame 621 at 641; the free end of the lever 640 is slotted at 645 where it carries a block 646 having a ball joint connection 647 with a rod 648. The other end of the rod connects by a ball joint 649 with an arm 650 carried by the gripper frame 651.

The gripper frame 651 carries the bearings 668 in which is mounted the cam shaft 667, carrying a number of gripping cams 669. The gripping cams are intended to actuate a greater or a smaller number of piling grippers, according to the size of pile to be formed. The piling grippers (Figs. 52, 53 and 54) are composed of the top plates 670 which carry central pivoting pins 671 upon which they are made to turn in order to give the bricks the proper angle which they occupy in the pile (Fig. 61). The pins 671 pass through the bearings 672 at one end of the arms 673 and projecting beyond the said bearings they receive the swinging levers 674. A bar 676 connects all the levers 674 by engaging the pins 675 carried at the ends of the latter. By moving the bar 676 in one or in the other direction the grippers may be made to turn accordingly so as to swing to the right or to the left, thus giving the bricks the angle of the upper layer of the pile (Fig. 61) or that of the lower layer of the same.

The arms 673 are forked at the other end where they are provided with bearings 358 whereby they are mounted upon the cam shaft 667. Ears 677 are provided on the sides of the arms 673 and are made to rest upon the projections 678 carried by the gripper frame 651. Gripping plates 688 and 690 are arranged on the opposite sides of the top plate 670 and are provided with the guiding tongues 691 made integral with plate 688 and fitted to slide from one direction in the grooves 692 cut in the top plate 670, and with the tongues 693 formed integral with the plate 690 fitted to slide in the same grooves 692 from the other direction. Yielding plates 696 held by the springs 697 are mounted on the plates 688 and 690.

The gripping plates are held together by tension springs 698 and are provided with toggles 684 to force them apart.

The mechanism for spreading the gripping plates apart consists of the levers 680 which are fulcrumed to the pivoting lugs 679 carried by the arms 673. The said levers 680 carry at one end the rollers 681 engaging the cams 669 on the cam shaft 667, while the other free ends of said levers pass through the slots 682 provided in the cross beams 683 operating the toggles 684 by means of the links 686.

The toggles 684 are pivoted at one end of the lugs 687 carried by the tongues 691 and to the lugs 689 carried by the tongues 693. Guiding slots 694 cut in the posts 695 carried by the top plate 670 serve to guide the center pins 685 of the toggles.

By giving the cam shaft 667 a turn in one direction, the cams 669, engaging the rollers 681, raise the ends of the levers 680 and cause the opposite ends to come down, thus lowering the cross beams 683; the two ends of said beam engaging by means of the links 686 the center pins 685 of the toggles 684 force the said pins down and cause the toggles to spread apart the gripping plates 688 and 690, thus releasing the hold on the brick. When the shaft 667 is given a turn in the opposite direction the pressure of the cam upon the roller 681 is released, the tension springs 698 will then draw the gripping plates together so as to engage the bricks.

For the purpose of operating the cam shaft 667 in order to engage the bricks by the grippers there is a shaft 636 mounted in the bearings 637 on the frame 621 and in the bearings 638 and 639 on the top bars 598. This shaft 636 carries a gear 635 which engages a pinion 634 carried on the shaft 626 from which shaft it receives its motion.

A grooved cam 652 cut on a cylinder carried by the shaft 636 is made to engage a roller 653 working on a pin at the end of an arm 654 secured to a shaft 655 fitted to work in the bearing 656 carried by the lower bar 597. At the other end, the shaft 655 has a universal joint 657 secured to a rod 658 sliding in a pipe 659. A key way is cut in the rod engaging a feather carried inside the pipe. At the other end the pipe 659 connects by means of a universal joint 661 with the shaft 660 working in the bearings 662 and 663 on the arm 650 carried by the gripping frame 651. A forked lever 664 secured to the shaft 660 connects by means of the link 666 with a forked lever 665 carried by the cam shaft 667, imparting motion to it.

After the bricks have been clamped in the grippers, the cam 721 begins to act, raising the piling arm, and thus raising the row of bricks off the distributing belt, then the cam 644 causes the gripper frame 651 to move forward and to one side so as to carry the bricks off the distributing belt.

At the same time the bar 676 is caused to move in one or in the other direction in order to turn the bricks to the proper angle which they occupy in the pile. For the purpose of actuating this bar 676, another track 723 (Figs. 47, 48, and 53) is secured to the track body 704 by the pivoting bolt 724 engaging the said track at one end, and by an adjusting bolt 725 secured to the track 723 and passing through a slotted hole 726 in the track body 704 at the other.

The track 723 may be set so as to come to a greater or less degree to the right or to the left of the center line of the cam track 704, by means of a bent hand lever 729 fulcrumed on a pin 730 and carrying at one end a pin 728 which joins by means of the link 727 with the bolt 725.

For locking the hand lever in place a quadrant 731 is secured to the track 704 and is provided with the notches 732 into which the latch 733 is fitted. This latch is fulcrumed to the hand lever 729 by a pin 734 and is held in engagement with the quadrant by the spring 735.

The bar 676 carries a pin 744 which is made to engage a slotted hole 743 provided at the end of a lever 742 carried at the end of a shaft 739. This shaft passes through a bearing 740 provided on the gripping frame 651, and has at the other end an arm 738 carrying at the free end a roller 736 working on a pin 737 and engaging a cam track 723. The cam track 723, through the motion of the gripper frame 651, thus swings the arm 738 to the right or to the left actuating the bar 676 through the shaft 739, the arm 742 and the pin 744, and causing the said bar to swing the gripper frames together with the bricks to the right or to the left according to the angle desired to be given the bricks in the pile.

At the end of the forward stroke of the gripper frame the bricks are at the proper angle and to one side of the piling arm, and are lowered down on the pile by the action of the cam 721 as stated above.

The grippers are then caused to release the hold on the bricks by the action of the cam 652 and the piling arm is again raised and returned to engage another row of bricks. At the same time the machine is caused to advance along the track for a distance equal to the spacing of the bricks in the pile.

The mechanism for advancing the machine along the track is illustrated in Figs. 1 and 3.

A sleeve 595 (Fig. 3) mounted to turn upon a stationary shaft 633 carries at one end a wheel 699 driven by a worm 745 secured to the shaft 278. The rate of gearing of the worm to the wheel being such as to cause the latter to make one revolution each time a row of bricks is deposited upon the pile. At the other end the sleeve carries a grooved cam 746 engaging a roller 747 carried by a swinging arm 748, which is pivoted at the top by the pin 749 and carries at the free end a double-ended pawl 750 which is made to engage a rack 751 laid upon the ground alongside one of the rails 10.

The worm 745 actuates the wheel 699 and causes the turning of the cam 746 which operates so as to swing the arm 748 together with the pawl 750. The latter engaging the rack 751 will act so as to propel the machine to the right or to the left along the track according to whether the pawl 750 is swung down to engage the track at the left of the swinging arm 748 or to the right of it.

When the piling of the bricks is to be done on the other side of the track, the frame 334 is turned around the pivoting pin 588 for an angle of 180°, thus bringing the distributing and piling arm on the other side of the machine; at the same time the double-pronged pawl 750, carried by the lever 748 (Fig. 1), is swung around so as to be at the right of the said lever, engaging the rack 751 by means of the other prong, and causing the machine to advance in the other direction each time a row of bricks is placed on the pile.

Having thus described my invention, what I claim as new, and desire to secure by Letters Patent is:

1. In a machine of the character described a frame, one or more portable mold boxes containing material for the formation of bricks placed upon said frame, a mold box chamber adapted to inclose a mold box reinforcing the walls of the same comprising two stationary side walls and two sliding end gates, mechanism for introducing a mold into said mold chamber, a plunger compressing the brick material, and means for clamping or releasing the mold box comprising a lining of a wedgy cross section slidably fitting one of said walls adapted to clamp the mold box at the sides, and inclines carried by said gates causing the clamping of said mold box at the ends.

2. In a combined brick pressing and piling machine the combination of a portable frame, a number of mold boxes adapted to receive material for the formation of bricks, a feed hopper containing brick material, and means for feeding said brick material from said hopper into said mold boxes all mounted upon said portable frame, and mechanism for compressing said material into bricks and devices for removing said bricks from said pressing mechanism and stack them into a stationary pile all carried upon said portable frame, the said devices comprising an elevator furnished with a number of shelves, a distributing arm, mechanism adapted to remove said bricks from said mold boxes and place them upon one of the shelves of said elevator, means for removing the bricks from the elevator and place them one at a time upon said distributing arm, and a piling arm adapted to engage an entire row of bricks upon the said distributing arm and place it upon a stationary pile.

3. In a machine of the character described, the combination of a mold boxes adapted to receive material for the formation of bricks, a plunger comprising a central body and an outer sliding sleeve held yieldingly upon said body and both adapted to enter the inside of the mold box in order to determine the outside dimensions of the compressed material, means adapted to lock the said outer sleeve to said central body, so as to have the pressing surfaces of the two in one plane, when they are removed from the surface of the material in the upward stroke and means adapted to unlock the said sleeve so as to cause it to slide upon the said central body and in the downward stroke come in contact with the material inside the mold box in advance of the said central body.

4. In a machine of the character described, the combination of a number of mold boxes adapted to move with an intermittent motion over an endless rectangular path, a number of stations located on said path, mechanism adapted to move said boxes from one station to the other, means adapted to deliver brick material to said mold boxes located at one or more stations, a plunger and a toggle actuating said plunger adapted to compress said material located at a second station, and mechanism for the removal of the compressed material from said mold box located at a third station, the said removing mechanism including a removing plate, rods supporting said removing plate, and a cam actuating said rods.

5. In a machine of the character described, the combination of one or more mold boxes adapted to receive material for the formation of bricks, automatic mechanism adapted to move said boxes along a track provided with a number of stations, mechanism adapted to deliver automatically brick material located at one of said stations, mechanism for compressing the said material located at a second station, and mechanism for the removal of the compressed material located at a third station, means for transporting the compressed brick from said third station to an elevator, means for removing the bricks from said elevator to a distributing arm and means adapted to transfer the said bricks from said arm and place them upon the pile.

6. In a machine of the character described, the combination of a number of mold boxes adapted to receive material for the formation of bricks, means for compressing the said material, into bricks, automatic means adapted to remove the said bricks from said mold boxes and place them upon an elevator provided with a number of shelves adapted to be driven in one or in the other direction, a distributing and piling arm adapted to be raised or lowered in order to place the bricks at a higher or lower level, means adapted to remove the bricks from a shelf of the elevator at one or at another level and place them upon the said distributing and piling arm, and means to actuate said piling arm in order to place the bricks on the pile.

7. In a machine of the character described, mechanism adapted to mold and press bricks, means adapted to transfer said bricks from the said pressing mechanism and distribute them in a row upon a distributing arm, a piling arm carrying a number of gripping devices adapted to engage an entire row of bricks, means adapted to turn the said gripping devices in one direction in order to swing all the bricks of the entire row for the desired angle toward the right while placing the bricks in one layer of the pile, and to turn the said grippers in the other direction toward the left while placing the bricks in the other layer of the pile.

8. In a machine of the character described a portable frame, a rear and a front axle provided with track wheels carried by said frame, tracks supporting said track wheels, mold boxes carried upon said frame, a container filled with brick material, brick pressing mechanism and devices for removing the bricks from said pressing mechanism and stack them in a stationary pile all mounted upon said portable frame, and propelling mechanism adapted to transport said container and said pressing mechanism and piling devices in one or in the opposite direction from one portion of said track to another portion of the same in order to form said stacks in one place or in another, said propelling mechanism comprising a driving shaft rotating in one and the same direction, a reversible clutch shaft, a gear provided with a tapering inner bore loosely mounted upon the clutch shaft and geared from the said driving shaft, so as to turn in the same direction as the latter, another gear also provided with a tapering bore and mounted loosely upon the clutch shaft geared to turn in the opposite direction to that of the driving shaft, cones turned to fit the inner tapering bores of said gears rigidly secured to said clutch shaft, means for shifting the clutch shaft so as to cause one or the other cone to engage the one or the other gear, thus causing the clutch shaft to rotate in the same or in the opposite direction to that of the driving shaft, and a driving connection between said clutch shaft and the said rear axle.

9. In a machine of the character described a portable frame, mechanism adapted to mold and press bricks placed upon said frame, a distributing arm pivoted upon a vertical pin carried by said frame and adapted to be turned so as to project beyond one or beyond the other side of the machine, means for locking said distributing arm upon said frame, a distributing belt carried by said distributing arm, means for transferring the bricks from said pressing mechanism and placing them upon said distributing belt, and a piling arm provided with a plurality of grippers adapted to engage an entire row of bricks upon said distributing belt and place it upon a stationary pile.

10. In a machine of the character described a portable frame, mechanism adapted to mold and press bricks placed upon said frame, a distributing arm pivoted upon a vertical pin adapted to be turned so as to project beyond one or beyond the other side of the machine, means for locking said distributing arm upon said frame, a distributing belt carried by said distributing arm, means for transferring the bricks from said pressing mechanism and placing them upon said distributing belt, a piling arm provided with a plurality of grippers adapted to engage an entire row of bricks upon said belt and place it upon the pile, and means adapted to advance the machine forward or backward according to whether the piling arm is turned toward the right or toward the left of the machine.

11. In a machine of the character described, the combination of one or more mold boxes adapted to receive material for the formation of bricks, means for applying an outer pressure to said material whereby the outside dimensions of the brick are determined, a number of pins adapted to apply a pressure to said material, and means for actuating the said pins, including a connecting rod, operating toggles, the said connecting rod carrying a hydraulic cylinder containing a liquid and provided with a piston furnished with valves adapted to release the liquid when the pressure in the interior of the cylinder raises above a predetermined point and to admit the liquid into the cylinder, when the pressure falls below one atmosphere.

12. In a machine of the character described, the combination of one or more mold boxes adapted to receive material for the formation of bricks, mechanism applying a pressure to said material whereby the outside dimensions of the brick are determined, comprising a crank and a connecting rod operating a toggle and a number of pins adapted to apply a final pressure to said material, the said connecting rod being of such a length as to carry the central pin of the toggle beyond the dead center in order to keep the brick inclosed while the final pressure is applied by the said pins.

13. In a machine of the character described, one or more mold boxes adapted to receive material for the formation of bricks, a number of holes provided in one or more of the sides of the mold boxes, a number of pins adapted to pass through said holes, a device for applying a pressure to said material whereby the outside dimensions of the bricks are determined, means for applying a final pressure to said material by forming cavities in the brick, and means adapted to lock the said devices so as to preserve the outside dimensions of the brick, while the final pressure is applied.

14. In a machine of the character described, the combination of one or more mold boxes adapted to receive material for the formation of bricks, the said mold boxes being formed of a number of plates provided with bevel edges and held together yieldingly, means for compressing said material inside said mold boxes, automatic means for removing the compressed material from the inside of said mold boxes, and means for extending the sides of said mold boxes after the pressure upon the said material has been withdrawn, comprising a lower frame and an upper frame placed one below and the other above the mold box and provided with beveled edges facing said mold box, and means adapted to bring the said frames closer together.

15. In a machine of the character described, the combination of one or more mold boxes adapted to receive material for the formation of bricks, the said mold boxes being formed of a number of plates provided with bevel edges and held together yieldingly and of a loose plate forming the bottom of the box, means for compressing said material inside the said mold boxes, means for extending the sides of said mold boxes comprising a lower frame and an upper frame placed one below and the other above the mold box and provided with beveled edges facing said mold box, means adapted to bring the said frames closer together, and a removing plate fitted to slide in the inside of the lower frame and secured to upright sliding rods adapted to engage the bottom plate of the mold box and a lever actuated by a cam adapted to engage the said upright rods and move them at one time upward, thus raising the bottom plate of the mold box together with the brick and lower them down at another time, thus lowering the said bottom plate and returning it into the mold box.

16. In a machine of the character described, one or more mold boxes provided with a sliding bottom plate, adapted to receive material for the formation of bricks, means for compressing said material inside said mold boxes to form bricks, a removing plate carried on top of upright sliding rods adapted to engage the said bottom plate and elevate it above the mold box together with the brick, gripping mechanism adapted to engage the said brick so as to sustain it while the said removing plate is lowered and a tilting plate is raised, and means adapted to swing the said tilting plate.

17. In a machine of the character described, mechanism adapted to mold and press bricks, means adapted to remove said bricks from said mechanism and raise them to a higher elevation, a carriage provided with gripping mechanism adapted to engage a brick and fitted to slide upon a horizontal slide carried by a frame, a horizontal frame adapted to be raised and lowered, means adapted to actuate the said grippers, means to move the said carriage along the slide and means to impart an up and down motion to said horizontal frame.

18. In a machine of the character described, mechanism for molding and pressing bricks, means adapted to remove said bricks from said mechanism and raise them to a higher elevation, an elevator provided with a number of shelves adapted to be driven with an intermittent motion in one or in the other direction, a carriage adapted to engage the bricks at the said higher elevation and place them upon the shelves of said elevator, while they are resting at a definite level, and means adapted to remove the bricks from the said shelves while they are resting at another level.

19. In a machine of the character described, mechanism for molding and pressing bricks, means adapted to remove said bricks from said mechanism and raise them to a higher elevation, an elevator provided with a number of shelves adapted to be driven with an intermittent motion in one or in the other direction, a carriage adapted to engage the bricks at the said higher elevation and place them upon the shelves of said elevator, while they are resting at a definite level, and a transporting arm carried upon a swinging shaft, and furnished with mechanism adapted to grip a brick and sustain it, means for swinging the said swinging shaft and means adapted to raise and lower to a greater or less extent the said transporting arm.

20. In a machine of the character described, the combination of a number of mold boxes provided with slots cut in their longitudinal sides to form a lower flange, holes or depressions drilled in said flange, draw rods working in split guides and furnished with gripping arms, carrying pins, the said arms being adapted to enter the said slots, and engage the said flanges of the mold boxes by causing the said pins to enter the holes in said flanges, sliding blocks held in place by collars fitted loosely upon said rods, sleeves fitted to turn in stationary bearings provided with feathers adapted to engage key ways in said rods, means for moving longitudinally the said sliding blocks and means for turning the said sleeves.

21. In a machine of the character described, a number of mold boxes provided with holes in their lateral sides, sliding carriages furnished with bearings fitted with shafts carrying at one end gripping arms furnished with pins fitted to engage the said holes, operating arms secured at the other ends of said shafts, bearings carried by said carriages fitted with sleeves provided with feathers and having arms connecting by means of links with the said operating arms, thus forming operating toggles, operating rods fitted to turn in stationary bearings furnished with key ways and made to pass through the said sleeves, means operating to slide the said carriages back and forth and means operating to turn the said operating rods.

22. In a machine of the character described, a number of mold boxes, means for delivering material into said boxes, means for compressing said material into bricks, means for moving the said compressed bricks and placing them one at a time upon an endless belt, means adapted to advance repeatedly the said belt each time a brick is placed there, and a piling arm adapted to engage an entire row of bricks and place it upon a pile.

23. In a machine of the character described, a number of mold boxes, means for delivering material into said boxes, means for compressing said material into bricks, means for removing said compressed bricks and for placing them one at a time upon a distributing belt, a piling arm guided in tracks at the ends, and furnished with gripping mechanism adapted to engage an entire row of bricks, elevate it above the distributing arm and carry it on a diagonal course, when it is lowered and placed on the pile.

24. In a machine of the character described, mechanism adapted to mold and press bricks, means adapted to transfer said bricks from the said pressing mechanism and distribute them in a row upon a distributing arm, a piling frame adapted to engage successively entire rows of bricks, elevate them above the distributing arm and place them upon a pile to form layers, means for imparting a horizontal reciprocating motion to said piling frame, and means adapted to change the length of stroke of said piling frame by alternately increasing and diminishing the same each time a layer of bricks is completed in a pile.

GEORGE A. PETERSON.

Witnesses:
HENRY SALOMONSON,
JAMES PARKER.

Copies of this patent may be obtained for five cents each, by addressing the "Commissioner of Patents, Washington, D. C."